US010628463B2

(12) United States Patent
Purumala et al.

(10) Patent No.: US 10,628,463 B2
(45) Date of Patent: Apr. 21, 2020

(54) APPLYING GEO-TAGS TO DIGITAL MEDIA CAPTURED WITHOUT LOCATION INFORMATION

(71) Applicant: Adobe Inc., San Jose, CA (US)

(72) Inventors: Ram Prasad Purumala, Uttar Pradesh (IN); Ankit Gulati, Haryana (IN); Navneet Kaur, Mohali (IN); Dheeraj Kumar, Punjab (IN); Manik Singhal, Uttar Pradesh (IN); Akhil Deshmukh, Maharashtra (IN)

(73) Assignee: ADOBE INC., San Jose, CA (US)

( * ) Notice: Subject to any disclaimer, the term of this patent is extended or adjusted under 35 U.S.C. 154(b) by 411 days.

(21) Appl. No.: 15/093,554

(22) Filed: Apr. 7, 2016

(65) Prior Publication Data

US 2017/0293673 A1     Oct. 12, 2017

(51) Int. Cl.
| | |
|---|---|
| *G06F 16/29* | (2019.01) |
| *H04L 29/08* | (2006.01) |
| *G06F 3/0484* | (2013.01) |
| *G06F 3/0485* | (2013.01) |
| *G06F 16/48* | (2019.01) |

(52) U.S. Cl.
CPC .......... *G06F 16/29* (2019.01); *G06F 3/04847* (2013.01); *G06F 3/04855* (2013.01); *G06F 16/48* (2019.01); *H04L 67/1097* (2013.01); *G06F 2203/04803* (2013.01)

(58) Field of Classification Search
CPC ......... G06F 17/30867; G06F 17/30241; G06F 17/30864; G06F 17/30554; G06F 17/30598; G06F 17/30525; G06F 3/04847; G06F 17/218; G06F 16/9537; G06F 16/9535; G06F 16/29; G06F 3/0482; G06F 3/04815; G06F 16/35; G06F 16/387; G06F 16/285; G06F 16/434; G06F 16/487

See application file for complete search history.

(56) References Cited

U.S. PATENT DOCUMENTS

| | | | |
|---|---|---|---|
| 7,904,797 B2* | 3/2011 | Wong | G06F 17/30017 715/200 |
| 9,014,726 B1* | 4/2015 | Foster | H04W 4/02 455/418 |
| 9,529,800 B2* | 12/2016 | Hochmuth | G09G 5/377 |
| 9,563,644 B1* | 2/2017 | Castillo | G06F 17/30241 |
| 2009/0279794 A1* | 11/2009 | Brucher | G06F 17/30241 382/225 |

(Continued)

*Primary Examiner* — Apu M Mofiz
*Assistant Examiner* — Cindy Nguyen
(74) *Attorney, Agent, or Firm* — Keller Jolley Preece

(57) ABSTRACT

Systems and methods are disclosed for applying geo-tags to digital media items. In particular, in one or more embodiments, the disclosed systems and methods identify a plurality of digital media items lacking location information and group the plurality of digital media items into clusters based on one or more characteristics (e.g., time of capture). The systems and methods can modify the size and numbers of clusters of digital media items utilizing a clustering algorithm, clustering parameters, and a cluster adjustment control to approximate a location where the digital images were captured. Moreover, systems and methods provide a user interface for quickly and efficiently applying geo-tags to the clusters corresponding to the location.

20 Claims, 16 Drawing Sheets

(56) References Cited

U.S. PATENT DOCUMENTS

| | | | |
|---|---|---|---|
| 2014/0089461 A1* | 3/2014 | Harris | H04L 67/10 709/217 |
| 2014/0218394 A1* | 8/2014 | Hochmuth | G09G 5/377 345/629 |
| 2015/0156247 A1* | 6/2015 | Hensel | G06F 16/51 709/219 |

* cited by examiner

APPLYING GEO-TAGS TO DIGITAL MEDIA CAPTURED WITHOUT LOCATION INFORMATION

BACKGROUND

1. Technical Field

The present disclosure relates generally to associating a location with one or more digital media items. More specifically, one or more embodiments of the present disclosure relate to systems and methods that apply geo-tags to one or more digital media items captured without location information.

2. Background and Relevant Art

Digital visual media (e.g., digital images and digital video) have become pervasive in our modern digital society and economy. Indeed, with recent advances in digital media capturing devices, such as digital cameras, smartphones, and digital camcorders, individuals and businesses increasingly capture and store large repositories of digital media. For example, it is common for individuals to capture dozens of digital media items on a daily basis and store the digital images in a large digital media repository (e.g., via a cloud-based digital image storage and retrieval service).

Although recent advances have made capturing and storing digital media items relatively simple, managing, searching, and utilizing thousands of digital media items has become increasingly difficult and time consuming. Indeed, individuals often express frustration with the amount of effort required to locate, sort, and identify digital images stored in a large collection of digital media. Some conventional digital media management systems seek to address these problems by organizing digital media based on various characteristics, such as time, content, or location. For example, some conventional digital image management systems allow users to sort digital images based on the location where the digital images were captured to allow users to more easily utilize the digital images.

In many instances, however, digital media items are captured without information indicating a location. For example, many users utilize digital single-lens reflex cameras (or other digital media capturing devices) that lack GPS, mapping, or other location capabilities. Similarly, other users capture digital media with devices that have location capabilities, but disable the location capabilities due to privacy concerns. Accordingly, it is common for individuals to capture large numbers of digital media items that lack information identifying the location where the digital images were captured.

Some conventional digital image management systems seek to remedy the lack of location information in many digital media items by allowing users to apply location information after capture. For example, some conventional digital image management systems allow a user to tag individual digital media items with location information. Although such systems allow users to tag digital images with location information, they are time-consuming and difficult to use. Indeed, conventional digital management systems require users to engage in the manual and tedious process of exhaustively adding tags one by one to large sets of digital media.

These and other problems exist with regard to current techniques for associating and managing digital images based on location information.

BRIEF SUMMARY

Embodiments of the present disclosure provide benefits and/or solve one or more of the foregoing or other problems in the art with systems and methods that automatically associate location information with each digital media item in a group or cluster of digital media items. In particular, the system and methods group digital media items based on one or more common characteristics to generate clusters of digital media items. In particular, the systems and methods group digital media items into clusters based on common characteristics such that the clusters likely comprise digital media items captured at a common location. The systems and methods then allow the user to tailor the size of the clusters to help ensure that each digital media item in a cluster were captured at a common location. Moreover, upon grouping digital media items into clusters of digital media items, the systems and methods automatically apply geo-tags to associate the common location with each digital media item in a cluster based on user indication of the location.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1A:
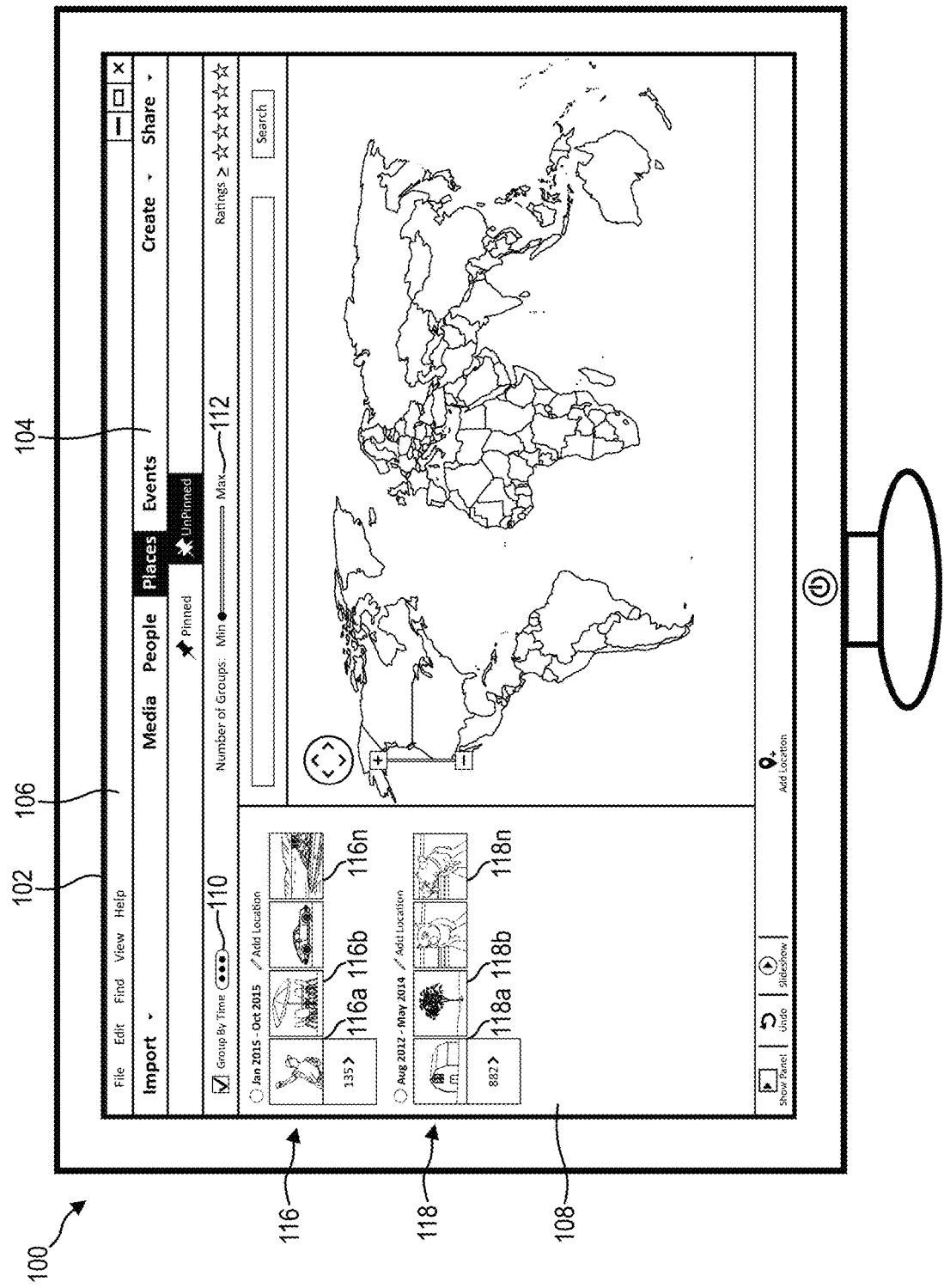
FIG. 1A illustrates a computing device displaying a user interface comprising a plurality of clusters of digital media items and a cluster adjustment control in accordance with one or more embodiments.

One or more embodiments of the present disclosure include a digital geo-tagging system that groups digital media items into clusters and utilizes the clusters to associate the digital media items with geo-tags. In particular, in one or more embodiments, the digital geo-tagging system automatically groups a plurality of digital media items into clusters based on common characteristics. Moreover, upon grouping the digital media items into clusters, the digital geo-tagging system applies geo-tags to the digital media items in the clusters, allowing the digital geo-tagging system to sort, display, and search the digital media items based on the applied geo-tags.

For example, in one or more embodiments, the digital geo-tagging system automatically groups a plurality of digital media items into clusters based on time stamps of each of the digital media items. Moreover, the digital geo-tagging system provides the clusters for display via a user interface with a cluster adjustment control (e.g., a cluster adjustment control that allows a user to fine tune the number and/or size of the clusters). Based on user input modifying the cluster adjustment control, the digital geo-tagging system regroups/resizes the clusters to allow the user to help ensure that all of the digital media items in the cluster were captured at or near the same location. In addition, based on additional user input indicating the location corresponding to a particular cluster, the digital geo-tagging system automatically associates a geo-tag with each digital media item in the particular cluster corresponding to the location.

In one or more embodiments, the digital geo-tagging system leverages the fact that digital media items captured within a finite time range are likely to have been captured at the same geographic location. Accordingly, as just mentioned, in one or more embodiments, the digital geo-tagging system clusters digital media items based on time stamps (e.g., time stamps reflecting a time of capture). In this manner, the digital geo-tagging system can group the digital media items into clusters reflecting a particular location and apply geo-tags corresponding to the particular location.

Moreover, by automatically grouping digital media items into clusters, the digital geo-tagging system reduces the time and effort required to apply geo-tags to digital media items. Indeed, in one or more embodiments, the digital geo-tagging system automatically groups a repository of digital media items into clusters, enabling a user to apply geo-tags with a single user interaction (e.g., a single click or a single drag and drop). Similarly, by clustering digital media items, users have a reduced risk of skipping digital media while assigning place tags, which frequently occurs in conventional systems.

In addition, as mentioned, the digital geo-tagging system allows users to easily fine tune clusters with cluster adjustment controls. In particular, in one or more embodiments, the digital geo-tagging system utilizes cluster adjustment controls to modify cluster parameters utilized to group the digital media items into clusters. Thus, the digital geo-tagging system provides an intuitive and simple solution to accurately categorize digital media items, without requiring users to engage in the time-consuming process of manually selecting individual digital media items.

For example, in one or more embodiments, the digital geo-tagging system provides visual representations of clusters alongside an interactive digital map to reduce the time and effort required to identify a location corresponding to clusters of digital media items. Upon a user dragging and dropping a cluster onto a location on the digital map, the digital geo-tagging system automatically associates the location with each digital media item in the cluster. Thus, the digital geo-tagging system enables users to easily and quickly assign geo-tags to a large volume of digital media with minimal user interaction.

In addition, upon applying geo-tags to a cluster of digital media items, the digital geo-tagging can continue to iteratively group remaining digital media into clusters. Indeed, after applying geo-tags to a first cluster of digital media items, the digital geo-tagging system analyzes the remaining digital media items and groups the remaining digital media items into clusters to enable a user to apply selection a location. Accordingly, users can quickly and easily traverse through iteratively generated clusters in a repository of digital media items and apply geo-tags corresponding to particular locations.

Furthermore, the digital geo-tagging system performs its functions with regard to a wide variety of digital media capturing devices, including digital media capturing devices that lack location capabilities such as GPS. Indeed, because one or more embodiments of the digital geo-tagging system utilize generic characteristics (e.g., time stamps) to identify clusters, the digital geo-tagging system operates with regard to any device that captures such characteristics (e.g., digital cameras that capture time stamps corresponding to digital images). Accordingly, the digital geo-tagging system can apply geo-tags to digital media captured with DSLR cameras or other cameras that lack capabilities for identifying location or generating geo-tags.

As mentioned previously, in one or more embodiments, the digital geo-tagging system groups digital media items into clusters. As used herein, the term "cluster" refers to a group of digital media. In particular, the term "cluster" includes a group of digital media items sharing a common characteristic. The digital geo-tagging system groups digital media items into clusters based on one or more common characteristics. In particular, in one or more embodiments, the digital geo-tagging system utilizes a clustering algorithm to group digital media items based on identified characteristics.

For example, in one or more embodiments, the digital geo-tagging system applies a clustering algorithm based on digital time stamps to group the digital media items into clusters. In this manner, the digital geo-tagging system generates clusters of digital media items comprising digital media items within a time window or threshold of time. In addition to digital time stamps, in one or more embodiments, the digital geo-tagging system can utilize other characteristics (e.g., gap between pictures, visual content of the digital images, color properties of a digital image) to group digital media items into clusters.

In addition to generating clusters, the digital geo-tagging system modifies or tailors the clusters. In particular, in one or more embodiments, the digital geo-tagging system modifies clustering parameters used to group digital images into greater or fewer clusters (e.g., group digital images into clusters with a larger or smaller number of digital images per cluster). For example the digital geo-tagging system provides a cluster adjustment control for display via a user interface. The digital geo-tagging system can detect user interaction with the cluster adjustment control and, in response, modify cluster parameters to vary the number and/or size of generated clusters. In this manner, the digital geo-tagging system allows users to quickly and easily fine-tune clusters so that digital media items within clusters more accurately correspond to particular locations.

As mentioned, the digital geo-tagging system also applies geo-tags to digital media items corresponding to particular locations. As used herein, the term "geo-tag" refers to data identifying a location. In particular, the term "geo-tag" includes data identifying a location associated with a digital media item (e.g., a location where a digital media item was captured, created, saved, or generated). For instance, the term "geo-tag" includes data identifying a latitude and/or longitude of where a digital media item was captured. Similarly, a "geo-tag" includes data identifying a country, state, city, street, or address where a digital media item was captured. A "geo-tag" can comprise one or more entries in a database associating location information with a digital media item. Similarly, a "geo-tag" can comprise metadata associated with a digital media item identifying the location where the digital media item was captured. Thus, in one or more embodiments, the digital geo-tagging system applies a geo-tag by modifying metadata associated with a digital media item to include information identifying a location associated with the digital media item (e.g., the location where the digital media item was captured).

In applying geo-tags to a digital media item, the digital geo-tagging system also determines a location corresponding to a digital media item. Specifically, in one or more embodiments, the digital geo-tagging system provides one or more location selection controls that enable a user to identify a location corresponding to a cluster of digital media items. For example, the digital geo-tagging system provides a location selection control for each cluster in a plurality of clusters that enables a user to select a location corresponding to the cluster. Similarly, in one or more embodiments, the digital geo-tagging system provides a location selection control in conjunction with a digital map that displays a particular location. The digital geo-tagging system applies a geo-tag based on user interaction with the digital map (e.g., drag and drop a cluster of digital images onto the digital map). In this manner, the digital geo-tagging system can quickly and easily apply geo-tags to a cluster of digital media items.

In addition to location selection controls, the digital geo-tagging system can also identify a location utilizing a variety of other techniques. In one or more embodiments, the digital geo-tagging system utilizes existing location information (e.g., an existing geo tag) from one digital media item to apply geo-tags to other digital media items. In particular, in one or more embodiments, the digital geo-tagging system identifies a digital media item with a geo-tag, determines that the digital image corresponds to a cluster, and applies the geo-tag to the entire cluster of digital media items.

Furthermore, the digital geo-tagging system can also provide for display visual representations of digital images corresponding to a particular location to allow a user to more easily search and identify digital images. For example, the digital geo-tagging system provides for display of a visual representation of a cluster of digital images at a location on a digital map that corresponds to the location identified by a geo-tag. Thus, the digital geo-tagging system utilizes geo-tags to provide digital images for display on a digital map so that a user can efficiently search and identify digital images based on location.

Although many exemplary embodiments are described herein in relation to digital images, the digital geo-tagging system can operate in conjunction with any type of digital media. As used herein, the term "digital media" or "digital media item" refers to any digital item capable of producing a visual representation. For instance, the term "digital visual media" includes digital images, digital video, digital animations, digital illustrations, etc. As used herein, the term "digital image" refers to any digital symbol, picture, icon, or illustration. For example, the term "digital image" includes digital files with the following, or other, file extensions: JPG, TIFF, BMP, PNG, RAW, or PDF. Similarly, as used herein, the term "digital video" refers to a digital sequence of images. For example, the term "digital video" includes digital files with the following, or other, file extensions: FLV, GIF, MOV, QT, AVI, WMV, MP4, MPG, MPEG, or M4V.

Additional detail will now be provided regarding the digital geo-tagging system in relation to illustrative figures portraying exemplary embodiments. Indeed, as mentioned previously, in one or more embodiments, the digital geo-tagging system provides an effective user interface where digital media is displayed in multiple clusters grouped based on common characteristics. The number of clusters can be refined utilizing a cluster adjustment control. Moreover, a digital map illustrated alongside the clusters enables quick user interaction with selected digital media to apply geo-tags.

Figure 1B:
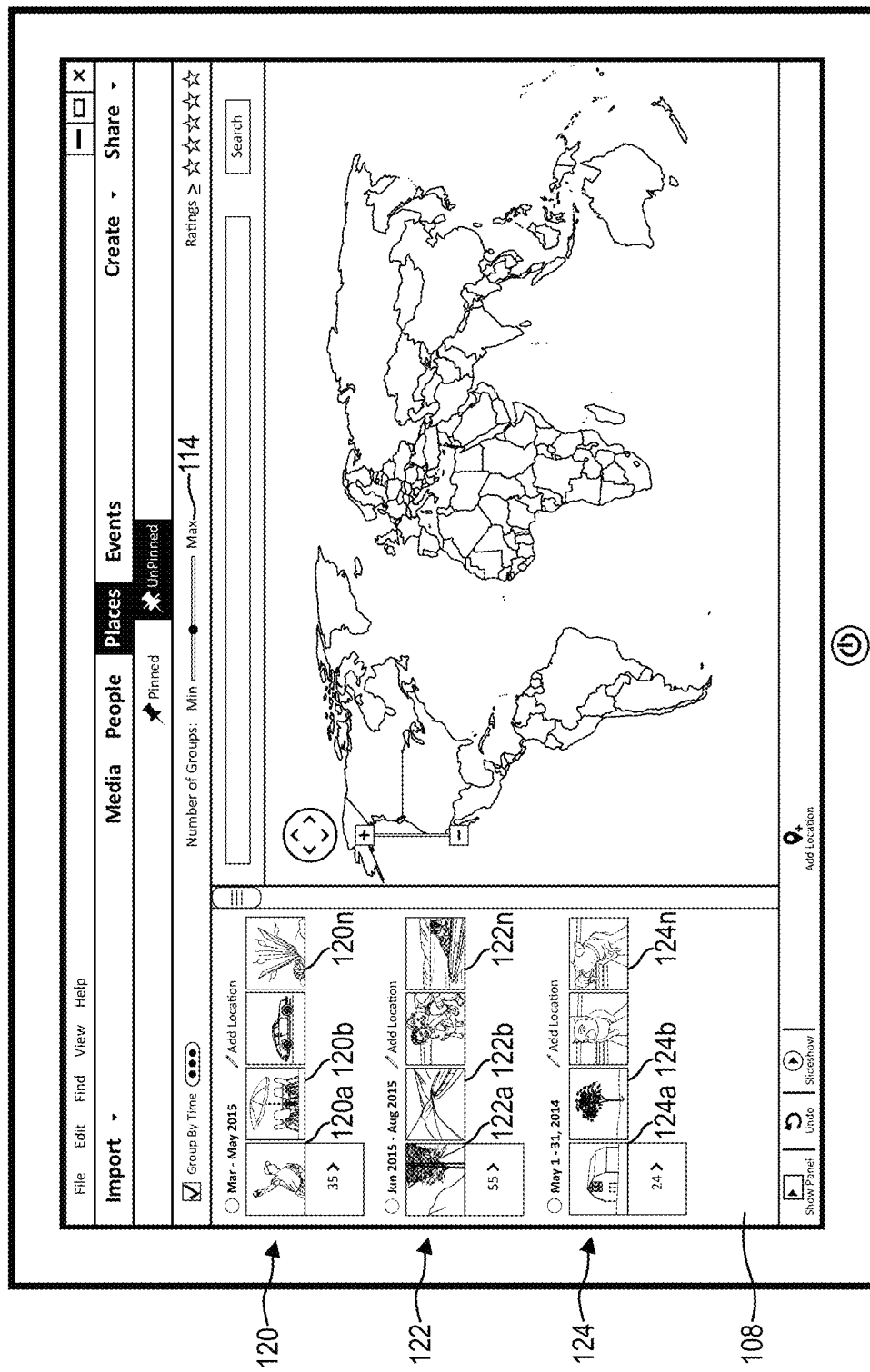
FIG. 1B illustrates the computing device of FIG. 1A with a second plurality of clusters of digital media items upon modification of the cluster adjustment control in accordance with one or more embodiments.

Turning now to FIGS. 1A-1B, additional detail will be provided regarding grouping digital media items into clusters in accordance with one or more embodiments. Specifically, FIGS. 1A-1B illustrate a process of clustering digital images and modifying clusters utilizing a cluster adjustment control. For instance, FIG. 1A illustrates a computing device 100 with a screen 102 displaying a user interface 104 corresponding to a digital media management application 106. Specifically, as shown in FIG. 1A, the user interface 104 comprises a digital image display area 108, a characteristic selection control 110, and a cluster adjustment control 112.

It will be appreciated that the digital geo-tagging system can be implemented in a variety of environments and utilizing a variety of components. For example, in relation to FIGS. 1A-4B, the digital geo-tagging system is implemented both as part of a computing device 100 displaying a user interface 104 and as part of a remote server in connection with the computing device via a digital network (e.g., the Internet). In particular, the digital geo-tagging system is implemented as part of a digital media management application 106 installed on the computing device 100 and/or as a web-based application hosted on a remote server, and accessible the computing device 100 via a network such as the Internet.

It will be appreciated that other implementations of the digital geo-tagging system are also contemplated by the present disclosure. For example, in relations to FIGS. 1A-4B, the digital geo-tagging system may be implemented as one or more operating systems, as one or more stand-alone applications, as one or more modules of an application, as one or more plug-ins, as one or more library functions or functions that may be called by other applications, and/or as a cloud-computing model. Thus, the digital geo-tagging system may be implemented as a stand-alone application, such as a native desktop computing application or mobile application. Furthermore, the digital geo-tagging system may be implemented as one or more web-based applications hosted on a remote server. Alternatively or additionally, the digital geo-tagging system may be implemented in a suit of mobile device applications or "apps." To illustrate, the digital geo-tagging system may be implemented in or by a digital media management application 106, including but not limited to ADOBE® BRIDGE® software, ADOBE® LIGHTROOM® software, ADOBE® PHOTOSHOP® software, or ADOBE® CREATIVE® CLOUD® software. "ADOBE," "BRIDGE," "LIGHTROOM," "PHOTOSHOP," and "CREATIVE CLOUD" are either registered trademarks or trademarks of Adobe Systems Incorporated in the United States and/or other countries.

In one or more embodiments, the digital geo-tagging system (e.g., via the digital media management application 106) accesses a repository of digital images. For example, the digital geo-tagging system searches for, and identifies, digital images stored locally on the computing device 100 (e.g., digital images stored on a smartphone or personal computer). Similarly, the digital geo-tagging system can access a repository of digital images stored on a remote server (e.g., a cloud-based digital media storage service associated with the computing device 100 or a user of the computing device 100).

In one or more embodiments, the digital geo-tagging system identifies digital images with geo-tags and digital images without geo-tags. Moreover, the digital geo-tagging system filters the repository of digital images based on whether the digital images have geo-tags. For example, the digital geo-tagging system filters a repository of digital images and identifies those digital images without geo-tags (e.g., "UnPinned" digital images).

Upon accessing (and/or filtering) a repository of digital images, the digital geo-tagging system groups the digital images into clusters utilizing one or more common characteristics. For example, as shown in FIG. 1A, the characteristic selection control 110 is selected such that the digital geo-tagging system utilizes "Time" to group digital images into clusters. Indeed, because users tend to capture digital images in a single location over a finite period of time, utilizing a clustering algorithm to group digital images based on time can provide a reasonable approximation of location.

Accordingly, the digital geo-tagging system segregates digital images into a first cluster 116 (comprising digital images 116a-116n) and a second cluster 118 (comprising digital images 118a-118n). Specifically, the digital geo-tagging system utilizes a clustering algorithm to group the plurality of digital images into clusters based on the time that each digital image was captured.

For example, with regard to FIG. 1A, the digital geo-tagging system detects time stamps of each of the digital images. As used herein, the term "time stamp" refers to data identifying a time. In particular, the term "time stamp" includes data associated with a digital media item. For example, the term "time stamp" includes metadata associated with a digital media item identifying a time that the digital media item was captured, created, saved, or generated.

For instance, in relation to FIG. 1A, the digital geo-tagging system accesses metadata associated with the repository of digital images and identifies time stamps from the metadata. Moreover, the digital geo-tagging system utilizes the detected time stamps to generate the clusters 116, 118.

Specifically, the digital geo-tagging system applies a clustering algorithm to the detected time stamps and generates clusters of digital images based on the time stamps. As used herein, the term "clustering algorithm" refers to a process for grouping a set of digital media items. In particular, the term "clustering algorithm" includes a set of computer instructions that group digital media into clusters. Although the digital geo-tagging system can apply a variety of different clustering algorithms, with regard to the embodiment of FIG. 1A, the digital geo-tagging system applies a k-means clustering algorithm to the time stamps to generate the clusters 116, 118. In particular, the digital geo-tagging system applies a k-means clustering algorithm and generates the clusters 116, 118 comprising digital images with common time stamps (e.g., time stamps falling within a common, threshold period of time).

A k-means clustering algorithm is a method of vector quantization that partitions observations (e.g., digital media) into k clusters, in which each observation belongs to the cluster with the nearest mean. In addition to a k-means clustering algorithm, it will be appreciated that the digital geo-tagging system can utilize a variety of clustering algorithms, including BIRCH, Hierarchical, expectation-maximization, DB SCAN, OPTICS, or mean-shift clustering algorithms.

In addition to time stamps, the digital geo-tagging system can also utilize other characteristics in conjunction with a clustering algorithm to generate the clusters 116, 118. For example, based on user interaction with the characteristic selection control 110, a user can select additional or alternative characteristics to utilize in grouping digital images into clusters. In particular, the digital geo-tagging system can group digital images into clusters (utilizing a clustering algorithm) based on individuals reflected in a digital image, items reflected in a digital image, color properties of a digital image (e.g., hue, tint, saturation, or brightness), etc. For example, the digital geo-tagging system can cluster digital images together that include a beach, a person in a particular outfit, items captured by the same device, other characteristics, or a combination of the foregoing and a time stamp.

Upon generating clusters of digital images, the digital geo-tagging system provides the clusters of digital images for display. For example, as shown in FIG. 1A, the digital geo-tagging system provides the clusters 116, 118 for display via the digital image display area 108. Providing the clusters 116, 118 for display via the digital image display area 108 enables a user to review, identify, and/or modify clusters of digital images. Indeed, in one or more embodiments, the digital geo-tagging system provides clusters for display and enables users to fine tune clusters (i.e., vary the granularity of clusters) to more accurately group digital images into clusters corresponding to a particular location.

Specifically, in one or more embodiments, the digital geo-tagging system utilizes various clustering parameters to generate (and modify) clusters. As used herein, the term "clustering parameter" refers to a parameter or value utilized by a clustering algorithm to create one or more clusters. For example, with regard to a k-means clustering algorithm, the term "clustering parameter" includes a k-value corresponding to the number of generated clusters. Accordingly, with regard to FIG. 1A, the digital geo-tagging system utilizes a k-value (e.g., 2) to generate the two clusters 116, 118.

In one or more embodiments, the digital geo-tagging system identifies clustering parameters based on user input. For example, with regard to the embodiment of FIG. 1A, the digital geo-tagging system identifies a cluster parameter based on the cluster adjustment control 112. As shown, the cluster adjustment control 112 (i.e., a slider element) is set to a minimum number of groups. Accordingly, the digital geo-tagging system utilizes a minimum cluster parameter and a minimum number of clusters (i.e., 2).

The digital geo-tagging system can also modify clusters (e.g., modify cluster parameters) upon user interaction with the cluster adjustment control 112 (e.g., modify the number of clusters and/or the number of digital images per cluster). For example, FIG. 1B illustrates the computing device 100 and the user interface 104 upon user interaction with the cluster adjustment control 112. In particular, a user selects the cluster adjustment control 112 and increases the desired number of clusters. In response, the digital geo-tagging system modifies one or more cluster parameters to increase the number of clusters. Specifically, with regard to the embodiment of FIG. 1B, the digital geo-tagging system modifies a k-value corresponding to a k-means clustering algorithm (e.g., increases the k-value from 2 to 10), increasing the number of resulting clusters. Accordingly, as shown in FIG. 1B, the digital geo-tagging system generates a plurality of clusters (e.g., ten clusters), including a first modified cluster 120 (comprising digital images 120a-120n), a second modified cluster 122 (comprising digital images 122a-122n), and a third modified cluster 124 (comprising digital images 124a-124n).

In one or more embodiments, the digital geo-tagging system generates a plurality of different sets of clusters (e.g., possible groups of digital images) and selects one set of clusters based on one or more cluster parameters. In particular, the digital geo-tagging system can generate a plurality of different sets of clusters and select one set of clusters based on user interaction with the cluster adjustment control 112. Additional detail will now be provided regarding a clustering algorithm utilized in one or more embodiments of the digital geo-tagging system to illustrate identifying clusters and modifying clusters in accordance with one or more embodiments.

In one or more embodiments, the digital geo-tagging system captures time stamps for each digital image and arranges the digital images according to time stamp (e.g., in ascending order according to time). The digital geo-tagging system then analyzes a time difference (or gap) between consecutive pairs of sorted time stamps. Based on these gaps, the algorithm generates a plurality of sets of clusters. The digital geo-tagging system then selects one of the sets of clusters based on user interaction with the cluster adjustment control 112.

For instance, application of a clustering algorithm utilized in one or more embodiments to generate sets of clusters can be illustrated with a specific example. Consider a set of six digital images with the following capture dates: Jan. 1, 2015; Jan. 2, 2015; Jan. 4, 2015; Jan. 7, 2015; Jan. 11, 2015, and Jan. 12, 2015. Such a set of six digital images can be clustered in five different ways. Each cluster may contain images varying from one to six digital images. In one or more embodiments, the digital geo-tagging system utilizes the following approach to group the digital images into sets of clusters:

1. Define the total time span of the image list as MAXDIFF. In this example, the MAXDIFF is 11 days (from January 1 to January 12).
2. Define a 'gap' object storing the time difference (g_diff) between each consecutive pair of image time stamps. Thus, each time difference results in one 'gap' object. In relation to the present example, the following time gaps result: g_diff 1 (corresponding to the difference between January 1 and January 2), g_diff 2 (corresponding to the difference between January 2 and January 4), g_diff 3 (corresponding to the difference between January 4 and January 7), g_diff 4 (corresponding to the difference between January 7 and January 11), and g_diff 1 (corresponding to the difference between January 11 and January 12).
3. Sort the gaps in descending order based on g_diff. In relation to the present example, the following sorted gaps result: g_diff 4 (corresponding to the difference between January 7 and January 11), g_diff 3 (corresponding to the difference between January 4 and January 7), g_diff 2 (corresponding to the difference between January 2 and January 4), g_diff 1 (corresponding to the difference between January 1 and January 2), and g_diff 1 (corresponding to the difference between January 11 and January 12);
4. Iteratively, assume a threshold amount of time (e.g., ranging from 20-100% of MAXDIFF, incremented by 2% in each iteration), and find the total number of gaps needed to surpass this threshold. In other words, for each threshold, begin at the largest gap and proceed in descending order, taking the sum of the time difference of the current gap and all preceding gaps until the sum exceeds the current threshold value. Identify the last gap required to exceed the current threshold value.
5. Count the last gap that exceeds the current threshold value, all previous gaps, and any other gap with the same time difference. Record each unique count of gaps for the iterative thresholds. For example, consider a threshold of 85% MAXDIFF (i.e., nine days). Begin at the largest gap, g_diff 4, and identify the amount of time (four days); proceed to the next largest gap, g_diff 3, and add the amount of time (three more days); proceed to the next largest gap, g_diff 2, and add the amount of time (two days); proceed to the next largest gap, g_diff 1, and add the amount of time (one more day). At this point, the sum of time from the gaps (ten days) exceeds the threshold amount of time (9 days). Accordingly, count the last gap (g_diff 1), all previous gaps (g_diff 4, g_diff 3, and g_diff 2) together with other gaps with the same time difference as the last gap (i.e., the second g_diff 1). This results in a count of five different gaps. Following this pattern iteratively through all threshold amounts of time in relation to the present example yields the following counts: 1 (e.g., the number of gaps counted to exceed three days), 2 (e.g., the number of gaps counted to exceed four days), 3 (e.g., the number of gaps counted to exceed seven days), and 5 (e.g., the number of gaps counted to exceed nine days, including both one day gaps).
6. Each of these counts reflect the possible distribution of images for a particular cluster set. Filter the list of gaps (from Step 2) as specified by the counts recorded (from step 5), and use the gaps (from Step 2) as partitions defining a cluster.

Thus, in the present example:

For count 1 (g_diff 4 is the only counted gap): The gap of g_diff 4 is considered and partitioned at January 7 (the gap corresponding to the identified g_diff). Hence the result is 4 images in a first cluster before January 7 and 2 in a second cluster after January 7.

For count 2 (g_diff 4 and g_diff 3 are the only counted gaps): Gap of g_diff 4 and g_diff 3 are considered and partitioned at January 4 and January 7. This results in 3 images in a first cluster, 1 image in a second cluster, and 2 images in a third cluster.

For count 3 (g_diff 4, g_diff 3, and g_diff 2 are the only counted gaps): Gap of g_diff 4, 3, and 2 are considered and partitioned at January 2, January 4, and January 7. This results in two images in a first cluster, one image in a second cluster, one image in a third cluster, and two images in a fourth cluster.

For count 5: All gaps are considered and partitioned at each date. This results in one image in six different clusters.

With regard to the exemplary embodiment just described, the clusters resulting from each count are treated as a single set of clusters with a corresponding cluster parameter. Specifically, the foregoing example produces four sets of clusters based on the identified four different counts (i.e., four different cluster parameters).

In one or more embodiments, the digital geo-tagging system utilizes the cluster parameter (e.g., the counts or k-values) to select a set of clusters. In particular, the digital geo-tagging system refers to the cluster adjustment control 112 and select a cluster parameter (e.g., select count 1, count 2, count 3, or count 5) based on the cluster adjustment control 112. For example, if the cluster adjustment control 112 is set to a minimum number of groups, the digital geo-tagging system utilizes the cluster parameter yielding the minimum number of clusters (i.e., count 1, resulting in two different clusters). Conversely, if the cluster adjustment control 112 is set to a maximum number of groups, the digital geo-tagging system utilizes the cluster parameter yielding the maximum number of clusters (i.e., count 5, resulting in six different clusters).

If the cluster adjustment control 112 is between the minimum and maximum, the digital geo-tagging system selects a clustering parameter that correlates to the particular position of the cluster adjustment control 112. For example, the digital geo-tagging system can divide the range of selections available in the cluster adjustment control 112 into sections corresponding to the cluster parameters (e.g., a first section corresponding to count 1, a second section corresponding to count 2, a third section corresponding to count 3, and a fourth section corresponding to count 4). The digital geo-tagging system detects a position of the cluster adjustment control 112 and applies the cluster parameter corresponding to the position. Accordingly, with regard to this particular example, the user has four different ways of clustering the digital media.

It will be appreciated that although the previous example indicates a particular number of digital images (and particular sets of clusters, i.e., four), the digital geo-tagging system can generate sets of clusters with regard to a different number of digital images and a different number of clusters. For example, because the embodiment of FIG. 1A includes hundreds of digital images, user interaction with the cluster adjustment control 112 can generate hundreds of different sets of clusters.

Moreover, it will be appreciated that applying a clustering algorithm does not generally result in clusters each having the same number of digital images (or clusters each spanning the same length of time). Rather, applying a clustering algorithm is likely to result in clusters with a different number of digital images, spanning different lengths of time. For example, with regard to FIG. 1B, the digital geo-tagging system utilizes a clustering algorithm to generate the first modified cluster 120 (comprising 39 digital images spanning over two months) and the second modified cluster 122 (comprising 59 digital images spanning over three months). Such variation is significant, because uses do not generally take the same number of pictures over the same duration of time in particular locations. Accordingly, utilizing a clustering algorithm enables the digital geo-tagging system to more accurately group digital images into clusters and avoid unnecessary time, user interaction, and effort.

Moreover, the digital geo-tagging system can modify clusters to more accurately identify digital images corresponding to a particular location. For example, a user can utilize the cluster adjustment control 112 to fine tune the modified clusters 120-124 to generate one or more clusters comprising digital images captured at a particular location.

Notably, with regard to the embodiments of FIGS. 1A-1B, the digital geo-tagging system identifies and presents sets of clusters without any user interaction with digital media. Indeed, the digital geo-tagging system groups digital images into clusters without requiring a user to select and add individual digital images. Accordingly, users can avoid the time consuming and laborious process of scanning through a large collection of digital images, manually selecting individual images corresponding to a particular location, and adding location information.

In addition to identifying one or more clusters and one or more cluster parameters based on user interaction with the cluster adjustment control 112, in one or more embodiments, the digital geo-tagging system automatically selects a cluster parameter (e.g., automatically sets a position on the cluster adjustment control 112 without user interaction). The digital geo-tagging system can select cluster parameters based on a variety of characteristics to group digital images into clusters that approximate a geographic location. For instance, the digital geo-tagging system selects a cluster parameter (or a particular set of clusters) based on a number of digital images in a repository of digital images, based on a time span of digital images in a repository of digital images, or based on a number of digital images in one or more clusters.

For example, if the digital geo-tagging system detects a large number of digital images in a repository of digital images, the digital geo-tagging system selects a cluster parameter to increase the number of clusters (e.g., adjust a cluster parameter to result in a set of clusters greater than a threshold number of clusters identified based on the number of digital images). Similarly, if the digital geo-tagging system detects a small number of digital images in a repository of digital images, the digital geo-tagging system selects a cluster parameter that decreases the number of clusters.

Similarly, if the digital geo-tagging system detects a large span of time in a repository of digital images, the digital geo-tagging system can select a cluster parameter that increases the number of clusters. Conversely, if the digital geo-tagging system detects a small span of time (e.g., one day or one week), the digital geo-tagging system can select a cluster parameter that decreases the number of clusters.

In addition, if the digital geo-tagging system determines that a large number or percentage of digital images fall within a particular cluster (e.g., over 90% of digital images in repository of digital images fall within a single cluster), the digital geo-tagging system can select a cluster parameter to reduce the number or percentage of digital images falling within a particular cluster. Conversely, if the digital geo-tagging system detects that clusters contain a small number or percentage (e.g., the average cluster contains less than 1% of a repository of digital images), the digital geo-tagging system can select a cluster parameter to increase the number or percentage of digital images falling within each cluster.

Figure 2A:
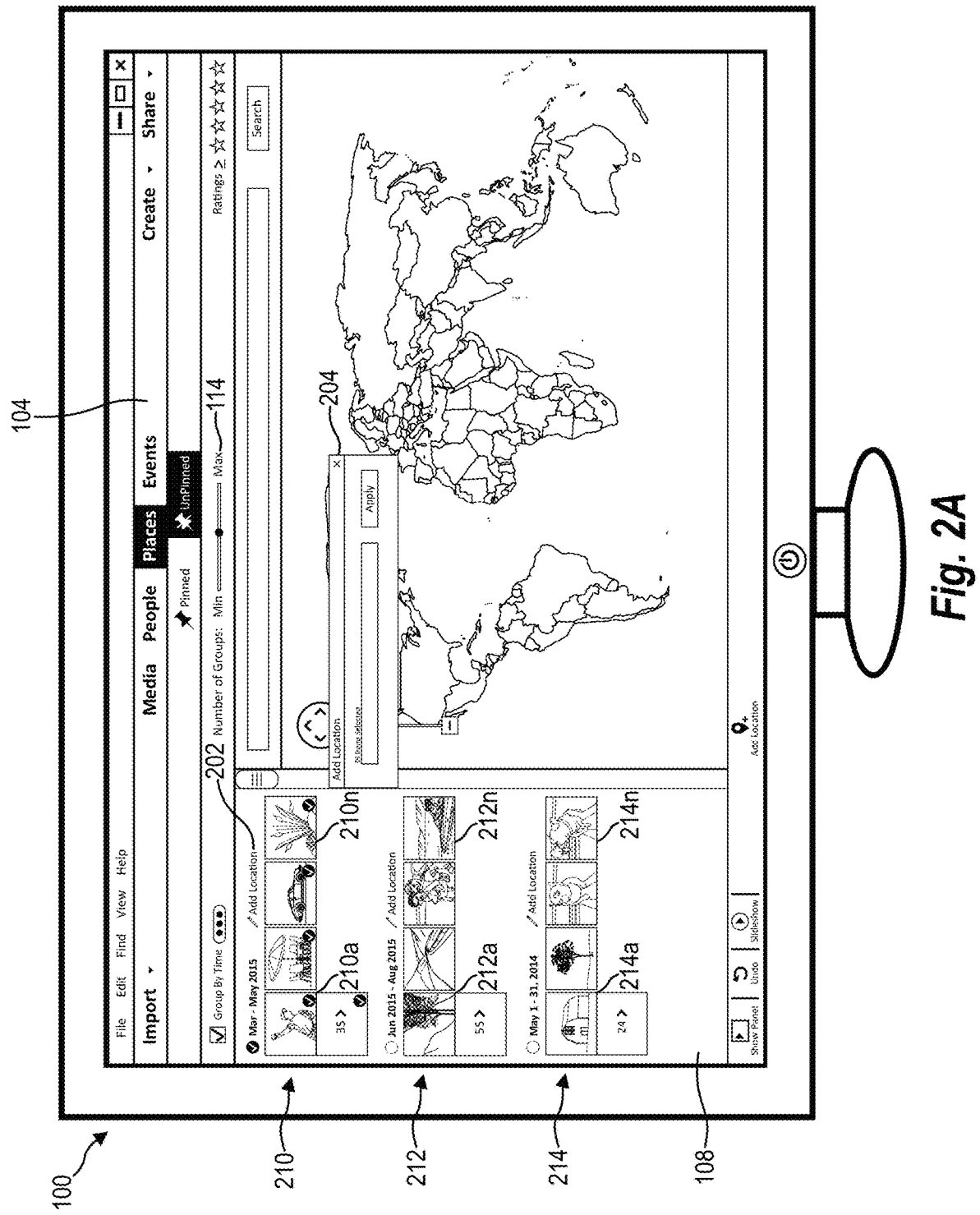
FIG. 2A illustrates a computing device displaying a user interface comprising a plurality of clusters of digital media items and a location selection control in accordance with one or more embodiments.

As mentioned previously, upon generating (and/or modifying) clusters of digital images, the digital geo-tagging system associates geo-tags with digital images in a cluster. For example, FIG. 2A illustrates a process of applying geo-tags to a cluster of digital images utilizing a location selection control. Specifically, FIG. 2A illustrates the computing device 100 displaying the user interface 104. Based on user interaction with the cluster adjustment control 112, the digital geo-tagging system generates a plurality of clusters including a first cluster 210 (comprising digital images 210a-210n), a second cluster 212 (comprising digital images 212a-212n), and a third cluster 214 (comprising digital images 214a-214n).

The user interface 104 also includes a location selection control 202 adjacent to the first cluster 210 (and similar location selection controls adjacent to the clusters 212, 214). As shown in FIG. 2A, upon user interaction with the location selection control 202, the digital geo-tagging system presents a location search element 204. Moreover, the digital geo-tagging system selects the first cluster 210 (and the digital images 210a-210n). Accordingly, the location search element 204 is configured to receive user input of a location (i.e., a location search) for the digital images from the first cluster 210.

Figure 2B:
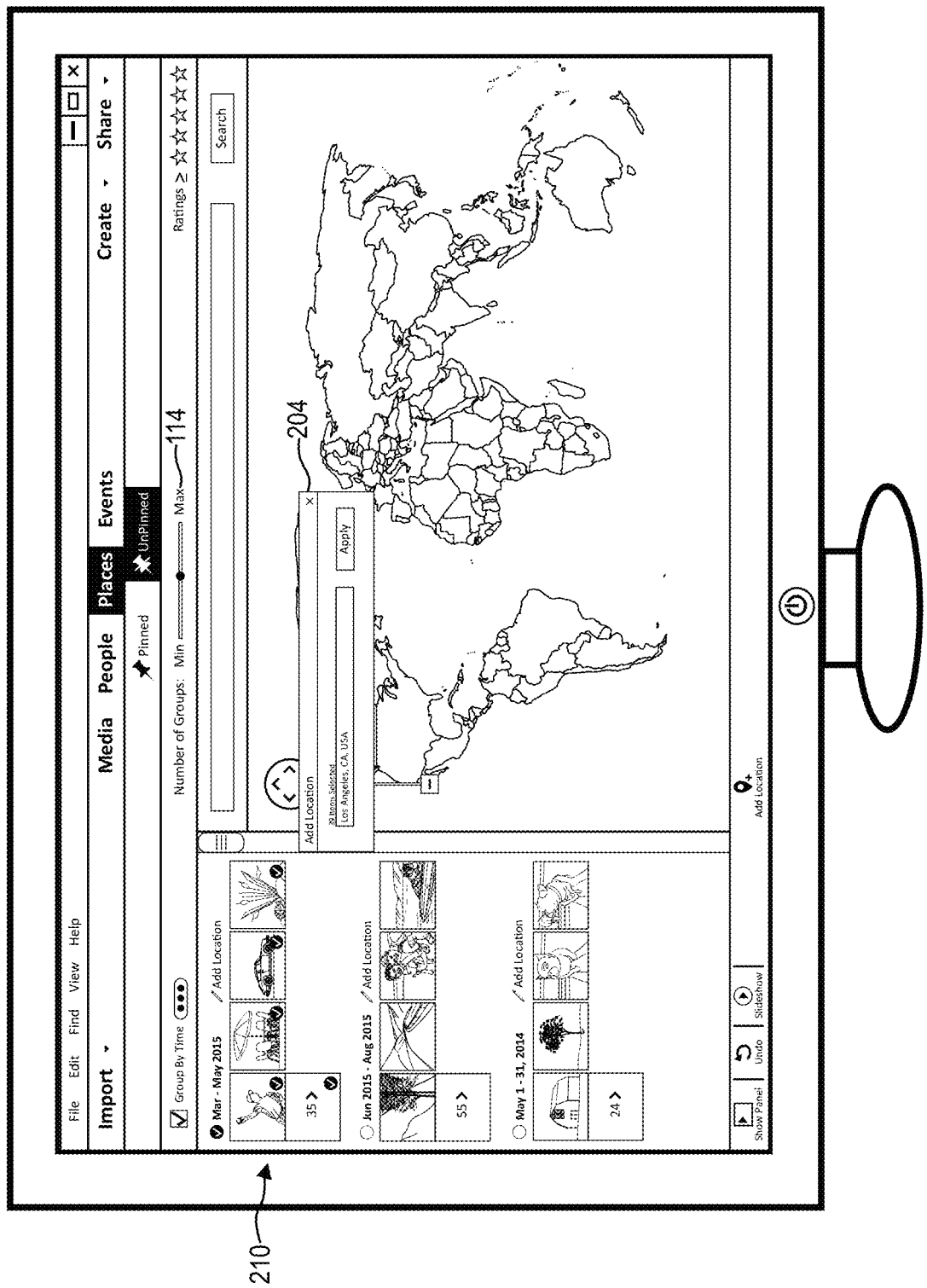
FIG. 2B illustrates the computing device of FIG. 2A and selection of a location corresponding to a cluster in accordance with one or more embodiments.

Indeed, as illustrated in FIG. 2B, a user can interact with the location search element 204 to identify and select a location corresponding to the first cluster 210. Specifically, with regard to FIG. 2B, the user enters text into the location search element. The digital geo-tagging system conducts a search for the text and identifies a particular location, i.e., Los Angeles, Calif., USA, based on the text. Moreover, the digital geo-tagging system can automatically apply a geo-tag to the first cluster 210 (i.e., the digital images 210a-210n) that identifies Los Angeles, Calif., USA (e.g., upon selection of the "Apply" button of the location search element 204). In one or more embodiments, the application of the geo-tag to the first cluster is performed in a single step such that a geo-tag is associated with all of the digital images in the first cluster in response to a single user interaction (e.g., selection of the "Apply" button).

In one or more embodiments, the digital geo-tagging system utilizes a third-party mapping service to identify location information corresponding to a digital image. For example, in one or more embodiments, upon detecting user entry of query keywords into the location search element 204, the digital geo-tagging system sends the query keywords to a third-party mapping service (e.g., send the keywords to Google Maps JavaScript API and Google Maps Geocoder service). The digital geo-tagging system can receive a response (e.g., a response from the API in JSON format) that includes possible matching locations (i.e., names and/or GPS information such as latitude and longitude). The digital geo-tagging system can provide the locations for display. Upon selection of a particular location, the digital geo-tagging system can apply a geo-tag identifying a particular location (e.g., GPS data, such as latitude and longitude).

In addition, the digital geo-tagging system can apply a geo-tag in a variety of ways. In one or more embodiments, the digital geo-tagging system enters a geo-tag into metadata of each digital image. In particular, the digital geo-tagging system applies a geo-tag to metadata such that the geo-tag can be utilized by other systems and applications. For example, the digital geo-tagging system transforms the metadata corresponding to a digital image (e.g., such that the geo-tag is permanently embedded in a digital file). Moreover, in this manner, upon sending the digital image to a third party system (or upon utilizing the digital image in relation to third party software), the third party system (or third-party software) can access the geo-tag and identify the location corresponding to the digital image.

In other embodiments, the digital geo-tagging system can apply a geo-tag such that the geo-tag is specific to the digital geo-tagging system (e.g., specific to the digital media management application 106). For example, in one or more embodiments, the digital geo-tagging system maintains a database of digital images and corresponding geo-tags (e.g., a database specific to the digital media management application 106). The digital geo-tagging system can apply a geo-tag to a digital image by adding an entry to the database (e.g., adding an entry that associates the digital image with the geo-tag).

In one or more embodiments, the digital geo-tagging system can control access to the database (e.g., exclude third-party systems or applications). Accordingly, the digital geo-tagging system can control access to the database such that a third-party system (or third-party software) the third-party system (or third-party software) utilizing the digital image cannot access the geo-tag or identify a location corresponding to the digital image. Moreover, the digital geo-tagging system can provide a control that allows a user to select how to apply geo-tags to digital images (e.g., a control that determines whether the digital geo-tagging system permanently modifies metadata in relation to digital images or applies a geo-tag in a local database specific to the digital geo-tagging system).

This feature can be beneficial because many users have concerns regarding location information corresponding to digital images. For example, users may wish to utilize geo-tags to search for and identify digital images in a private repository of digital images, but do not wish to publicly share location information (e.g., do not want location information included when sending digital images to a social networking service, via instant message, or by e-mail). Accordingly, the digital geo-tagging system can apply a geo-tag to a digital image such that the digital geo-tagging system can utilize the geo-tag to search for and identify the digital image without including the geo-tag when sending, sharing, or providing the digital image to other systems or applications.

It will be appreciated that although the embodiment of FIG. 2B illustrates a particular location (i.e., "Los Angeles, Calif., USA"), the digital geo-tagging system can identify a variety of locations with varying levels of specificity. For example, in one or more embodiments, the digital geo-tagging system identifies locations corresponding to a digital image based on country, state, county, city, region, street, address, suite, and/or room. Similarly, in one or more embodiments, the digital geo-tagging system identifies locations based on geographic coordinates, such as latitude, longitude, township, range, section, or other coordinate system. Thus, the digital geo-tagging system can apply geo-tags that identify different cities in a state, different streets in a city, or different structures on a street.

In one or more embodiments, the digital geo-tagging system identifies varies levels of specificity corresponding to a location by utilizing a third-party service. For example, in one or more embodiments, the digital geo-tagging system identifies GPS coordinates (i.e., latitude and longitude) corresponding to a location and sends the coordinates to a third-party mapping service (e.g., Google Maps Geocoding Service API). The digital geo-tagging system can receive a response including information comprising various levels of location information. For example, in one or more embodiments, the digital geo-tagging system extracts four levels of information: 1. First level: Country name; 2. Second level: Political entity name below country level (generally state/county name); 3. Third level: Political entity name below second level (generally city name); and 4. Fourth level: Possible precise location name (such as street name, a heritage place, or an airport).

In one or more embodiments, if the digital geo-tagging system determines a location corresponding to Golden Gate Bridge, San Francisco, Calif., USA, then the digital geo-tagging system will generate geo-tags of the following form: USA (First level), California (Second level), San Francisco (third level), Golden Gate Bridge (fourth level). In one or more embodiments geo-tags are automatically created corresponding to each of above location names. These geo-tags are associated with the digital images together with other location information (e.g., latitude and longitude). The digital geo-tagging system stores these geo-tags (e.g., in an application local database or in metadata corresponding to the digital images). Moreover, these geo-tags become available for searching and filtering purposes.

Figure 3A:
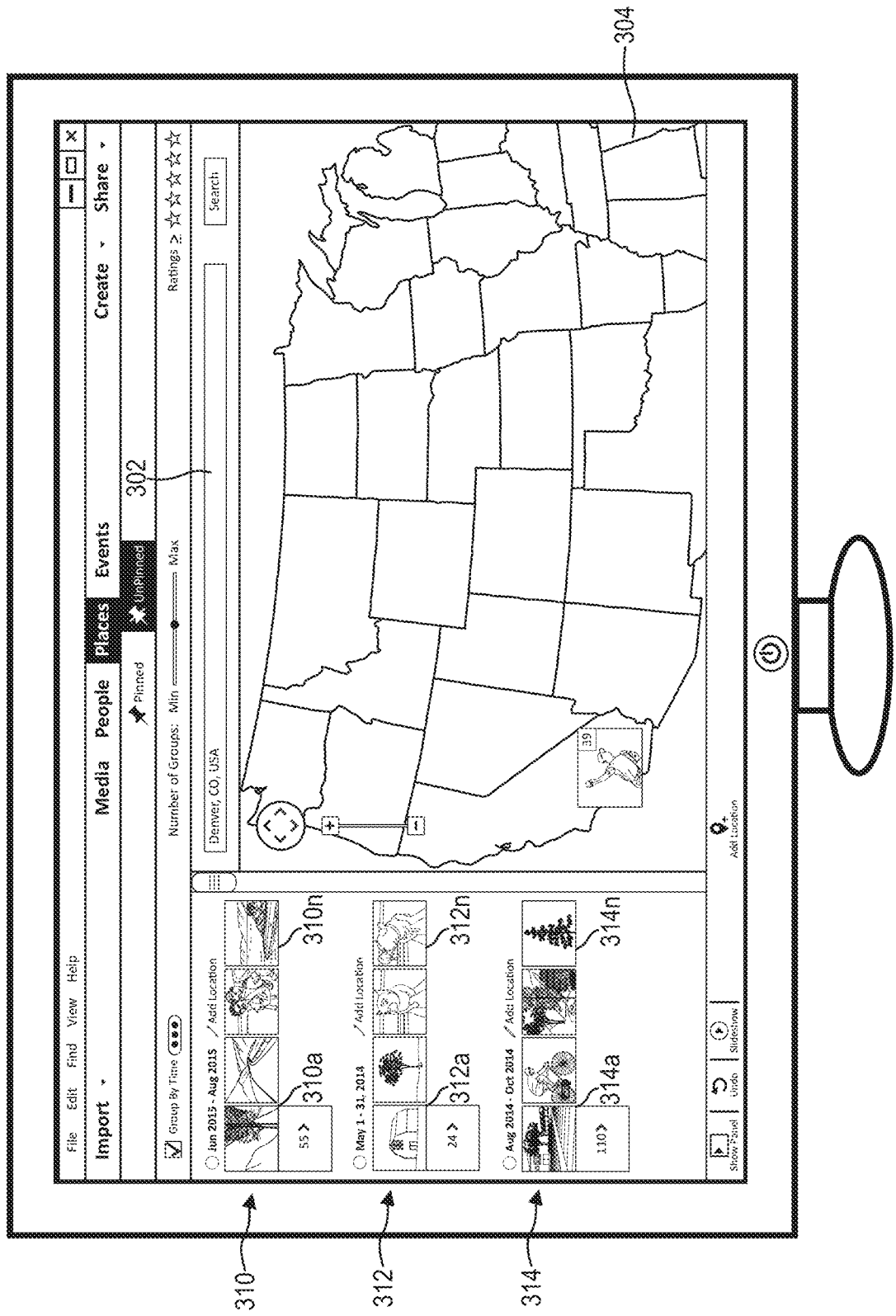
FIG. 3A illustrates a computing device displaying a user interface comprising a plurality of clusters of digital media items, a digital map, and a second location selection control in accordance with one or more embodiments.

In addition to the location selection control 202, the digital geo-tagging system can also identify a location corresponding to a cluster of digital images utilizing other controls, elements, and work flows. In particular, in one or more embodiments, the digital geo-tagging system utilizes a digital map. For example, FIG. 3A illustrates the computing device 100 displaying the user interface 104 comprising a plurality of clusters including a first cluster 310 (comprising digital images 310a-310n), a second cluster 312 (comprising digital images 312a-312n), and a third cluster 314 (comprising digital images 314a-314n). Moreover, the user interface 104 includes a location selection element 302 in conjunction with a digital map 304.

The location selection element 302 is operable to receive search keywords corresponding to a geographic location and conduct a search for the location (e.g., via an API call to a remote server, as discussed above). Moreover, the location selection element 302 is operable to identify the location and provide a visual representation of the location via the digital map 304. The digital map 304 can display geographic locations across the globe, including political boundaries (countries, states, cities, etc.), streets, structures, and/or aerial images. Accordingly, upon user entry of a search query corresponding to a location with regard to the location selection element 302, the digital map 304 can change (e.g., zoom, pan, or rotate) to display a visual representation of the location. A user can also interact with the digital map to zoom, pan, or rotate with various navigation controls to identify a particular location.

Figure 3B:
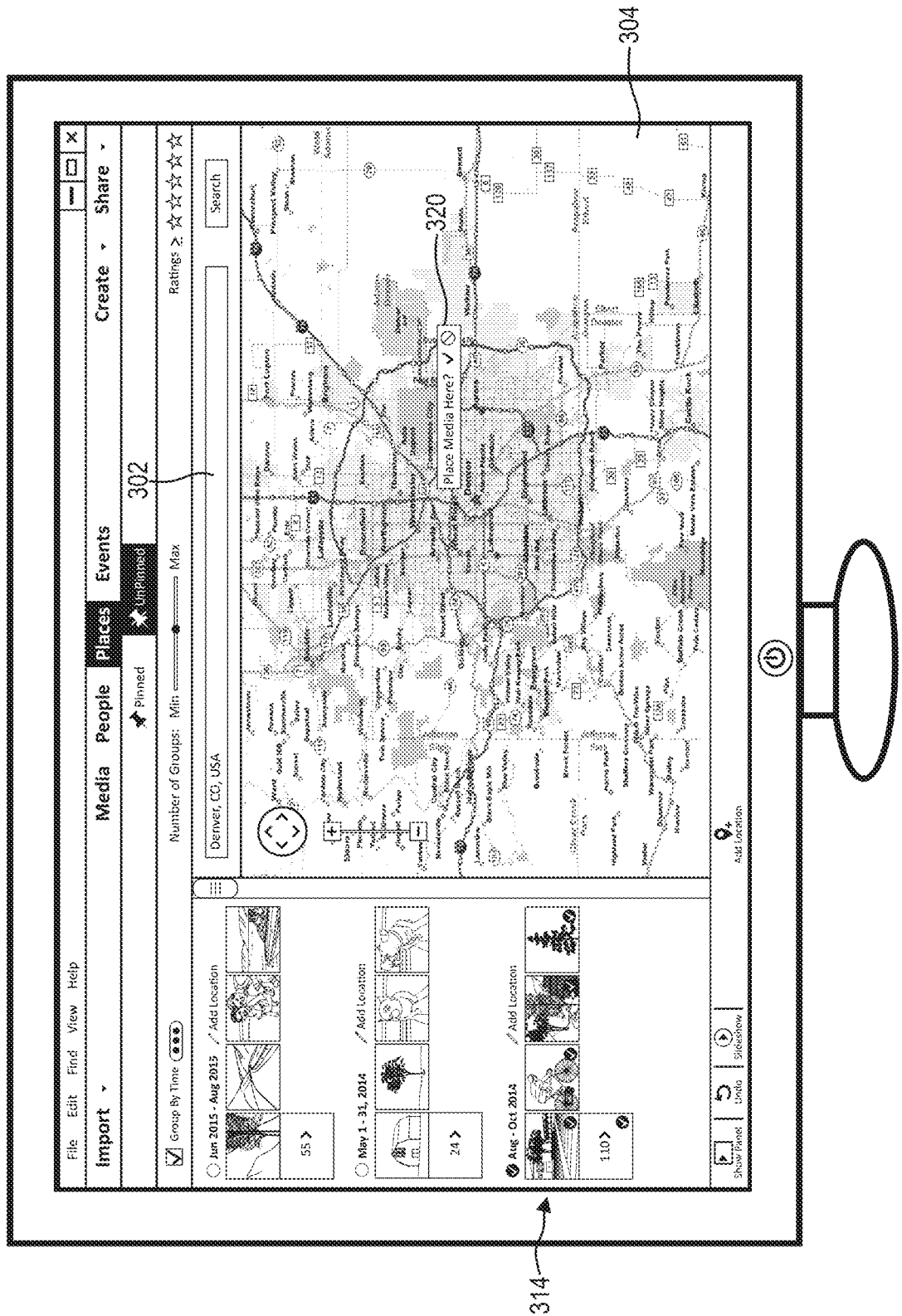
FIG. 3B illustrates the computing device of FIG. 3A and a digital map upon user input of a location in accordance with one or more embodiments.

FIG. 3A illustrates user input of search keywords, "Denver, Colo., USA," into the location selection element 302. Upon entry of these keywords (e.g., entry of keywords and selection of the "Search" button of the location selection element 302), the digital geo-tagging system can modify the digital map 304 to provide a visual representation of Denver, Colo. For example, FIG. 3B illustrates the computing device 100 with the digital map 304 displaying a representation of Denver, Colo.

In addition to displaying locations via the digital map 304, the digital geo-tagging system can identify a location corresponding to clusters of digital images based on user interaction with the digital map 304. For example, as shown in FIG. 3B, the user interface 104 includes a media placement element 320. Upon user interaction with the media placement element 320, the digital geo-tagging system applies geo-tags corresponding to the location (e.g., Denver, Colo.) to any selected cluster. In relation to FIG. 3B, the third cluster 314 is selected; thus, the digital geo-tagging system applies a geo-tag to the third cluster 314 corresponding to Denver, Colo.

Figure 3C:
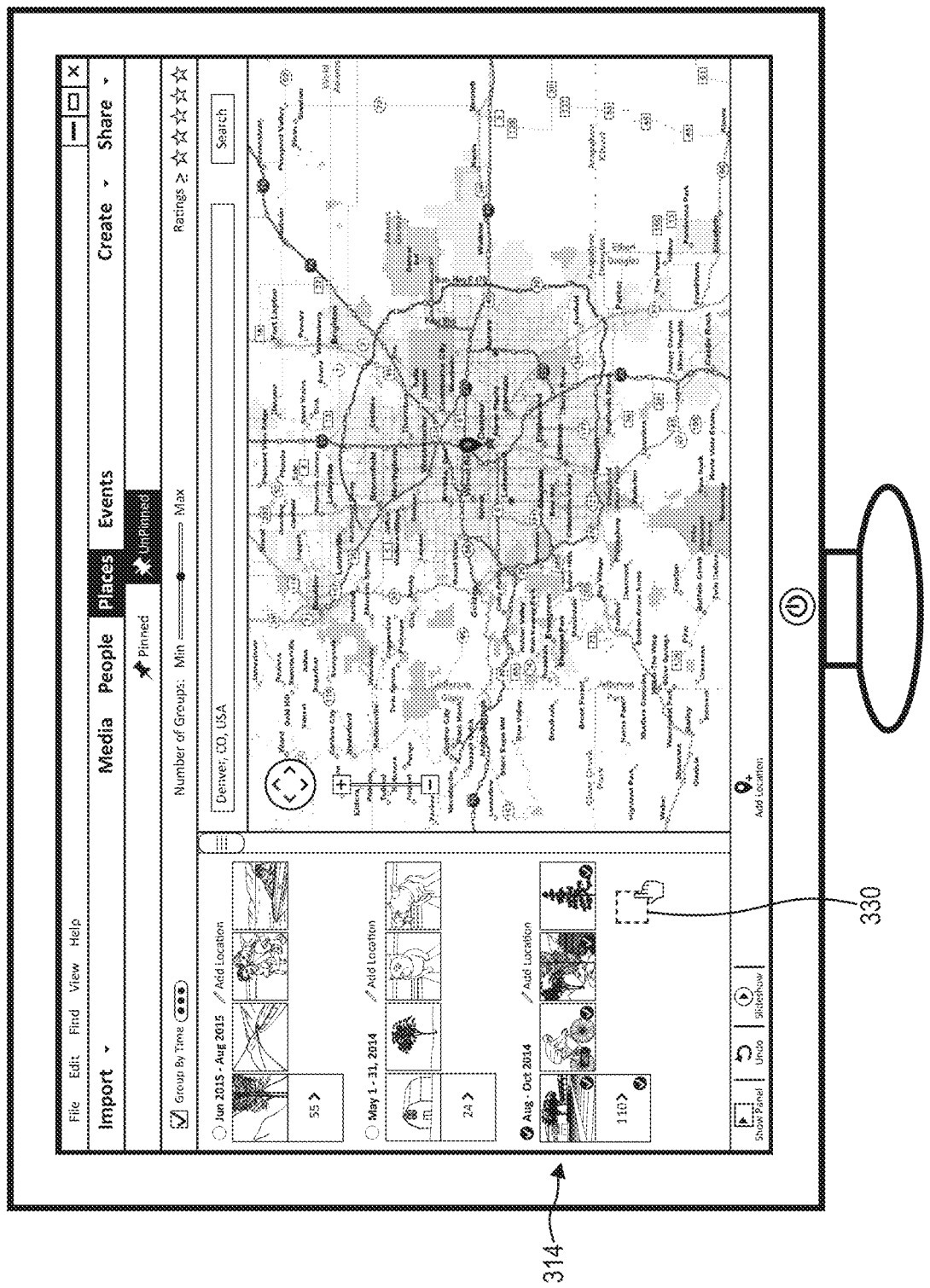
FIG. 3C illustrates the computing device of FIG. 3A and user interaction with a cluster in selecting a location in accordance with one or more embodiments.

In addition to user interaction with the media placement element 320, in one or more embodiments, the digital geo-tagging system can apply a geo-tag to a cluster of digital images in response to a user dragging and dropping the cluster onto the digital map. For example, FIG. 3C illustrates a user interaction with the third cluster 314. Specifically, FIG. 3C illustrates a click event and drag event in relation to the third cluster 314. Upon clicking and dragging the third cluster 314, the user interface 104 provides a digital image drag and drop element 330 for display. With regard to the embodiment of FIG. 3C, the digital geo-tagging system determines a location corresponding to the third cluster 314 based on user interaction with the digital image drag and drop element 330 and the digital map 304. In particular, the digital geo-tagging system detects a location of a release event on the digital map 304 corresponding to the digital image drag and drop element 330. In one or more embodiments, the digital geo-tagging system applies a geo-tag corresponding to the location on the digital map 304 where the user releases the digital image drag and drop element 330.

Figure 3D:
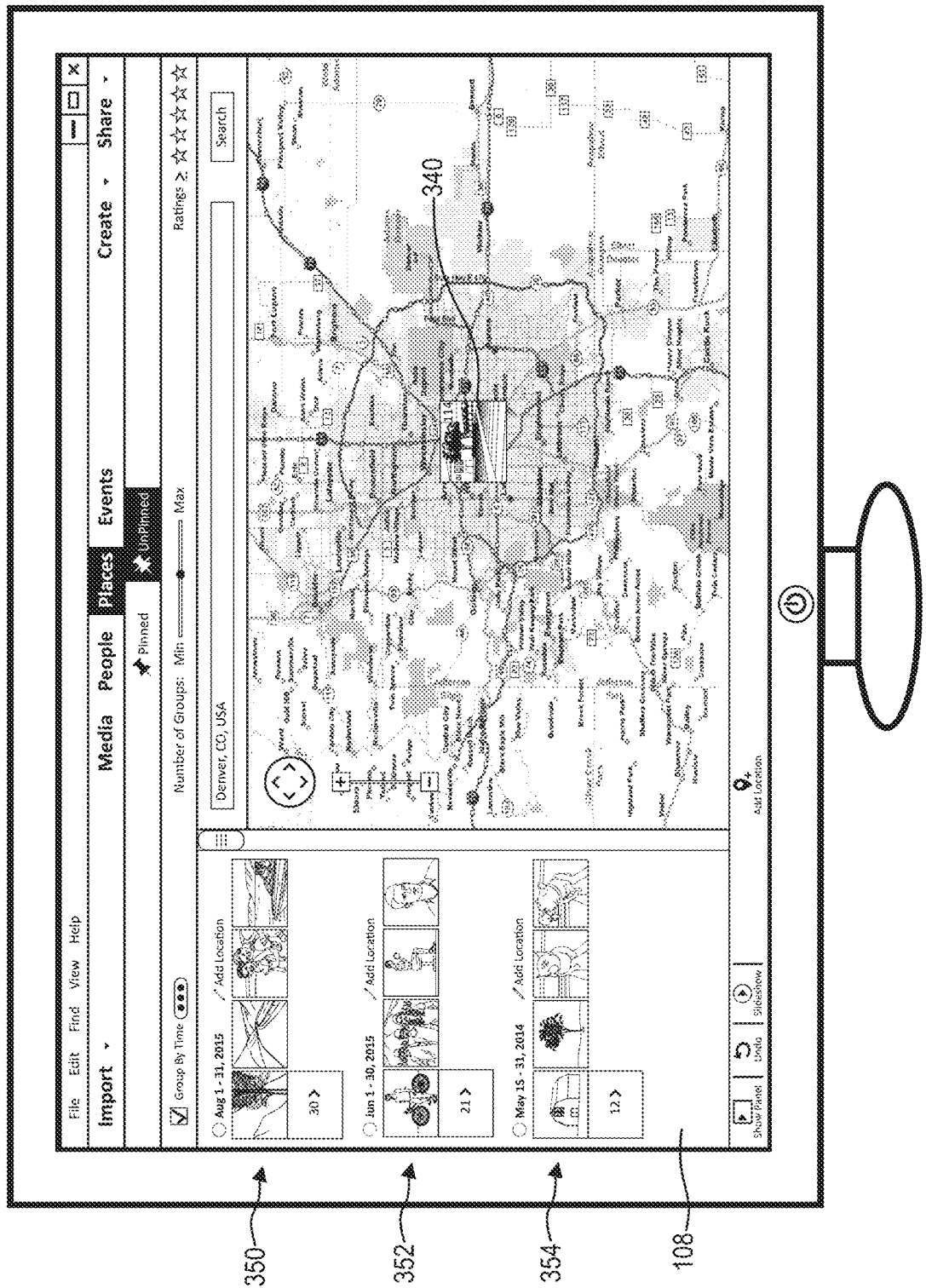
FIG. 3D illustrates the computing device of FIG. 3A and a visual representation of the cluster of digital media items and the location on the digital map in accordance with one or more embodiments.

For instance, FIG. 3D illustrates the computing device 100 and the user interface 104 upon user input of a release event (e.g., a mouse release event) with regard to the digital image drag and drop element 330 (i.e., release of the digital image drag and drop element 330 at a location on the digital map 304 corresponding to Denver, Colo.). The digital geo-tagging system applies a geo-tag to the third cluster 314 (i.e., the digital images 314a-314n) corresponding to the identified location on the digital map 304 (i.e., Denver, Colo.).

Moreover, as mentioned previously, in one or more embodiments, the digital geo-tagging system provides a visual representation of digital images in relation to a digital map. For example, as shown in FIG. 3D, the digital geo-tagging system also includes a visual representation 340 of the third cluster 314 in relation to the digital map 304. In particular, the digital geo-tagging system provides the visual representation 340 of the third cluster 314 on the digital map 304 corresponding to the location of Denver, Colo. (i.e., the location corresponding to the geo-tags applied to the digital images 314a-314n).

In this manner, the digital geo-tagging system provides an efficient and intuitive solution to applying geo-tags to a cluster of digital images. Notably, from the perspective of the user, the digital geo-tagging system automatically generates clusters of digital images (avoiding time and effort by the user to select or identify digital images corresponding to a particular location). Moreover, utilizing a single drag and drop user interaction with a digital map, the user can apply a geo-tag to all of the digital images in a cluster at once. Furthermore, the user can easily fine tune clusters based on user interaction with the cluster adjustment control 112 and continue to apply geo-tags.

In addition, as discussed above, in one or more embodiments, the digital geo-tagging system iteratively generates clusters of digital images as the digital geo-tagging system applies geo-tags. For instance, in one or more embodiments, the digital geo-tagging system iteratively filters out digital images with geo-tags and regroups the remaining digital images into clusters for additional analysis. For example, as shown in FIG. 3D, upon applying geo-tags to the third cluster 314 (i.e., the digital images 314*a*-314*n*), the digital geo-tagging system filters the digital images 314*a*-314*n* (i.e., removes the digital images 314*a*-314*n* from the digital media display area 108), and regroups the remaining digital images utilizing a clustering algorithm.

In particular, the digital geo-tagging system applies a clustering algorithm to the remaining digital images and generates a plurality of modified clusters, including the first modified cluster 350, the second modified cluster 352, and the third modified cluster 354. The digital geo-tagging system generates the modified clusters 350-354 by applying a clustering algorithm utilizing one or more previously identified clustering parameters (e.g., clustering parameters identified from the cluster adjustment control 112). As discussed previously, in one or more embodiments, the digital geo-tagging system can also select a modified clustering parameter based on a variety of characteristics of the remaining digital images. In this manner, the digital geo-tagging system can automatically provide a user with more detailed clusters as the user applies geo-tags to clusters of digital images. This enables users to quickly and efficiently proceed through clusters of digital images, identify locations, and apply geo-tags corresponding to the locations.

Although the embodiments of FIGS. 2A-3D illustrate identifying location information based on user interaction with one or more location selection controls, the digital geo-tagging system can also identify a location from other sources. For example, rather than filter digital images already associated with geo-tags, in one or more embodiments, the digital geo-tagging system utilizes digital images with geo-tags to identify location information for other digital images without geo-tags.

For example, the digital geo-tagging system applies a clustering algorithm to a repository of digital images containing some digital images with geo-tags and some digital images without geo-tags. As previously described, the digital geo-tagging system can generate clusters of the digital images utilizing a clustering algorithm and one or more common characteristics. The digital geo-tagging system can then utilize digital images with geo-tags to identify a location corresponding to the other digital images in the cluster (i.e., digital images without geo-tags).

For example, after generating clusters, the digital geo-tagging system can identify one or more digital images in the cluster with one or more geo-tags identifying Phoenix, Ariz. The digital geo-tagging system can utilize the one or more geo-tags identifying Phoenix, Ariz. to identify a location corresponding to the remaining digital images in the cluster that do not have geo-tags. Specifically, the digital geo-tagging system can recommend Phoenix, Ariz. to a user for a geo-tag based on the cluster containing digital images already containing a geo-tag identifying Phoenix, Ariz. In one or more embodiments, the digital geo-tagging system automatically applies geo-tags corresponding to a particular location when one or more other digital images in the cluster already has a geo-tag corresponding to the particular location.

Similarly, in one or more embodiments, the digital geo-tagging system can utilize digital images with geo-tags to more accurately group digital images into clusters. In particular, the digital geo-tagging system can utilize the digital images with geo-tags as one of the common characteristics for generating clusters. For example, the digital geo-tagging system can identify two digital images with geo-tags corresponding to different locations and generate clusters such that the two digital images do not belong to the same cluster.

In addition to identifying location information from existing geo-tags on a repository of digital images, the digital geo-tagging system can also identify location information from other sources. For example, the digital geo-tagging system identifies location information from other users. Indeed, in one or more embodiments, the digital geo-tagging system is implemented, at least in part, on a remote server connected to a plurality of users via a network (as described in greater detail with regard to FIG. 6). The digital geo-tagging system can determine that two users were located at the same location at the same time period and apply the location information to digital images captured during the time period.

For example, the digital geo-tagging system can identify a common location from geo-tags applied to the digital images of a second user (e.g., the digital images of a colleague, family member, or friend consistent with permission of the colleague, family member, or friend). The digital geo-tagging system can apply geo-tags (e.g., recommend a geo-tag location) to digital images of a first user based on the location information detected from digital images of the second user.

Figure 4A:
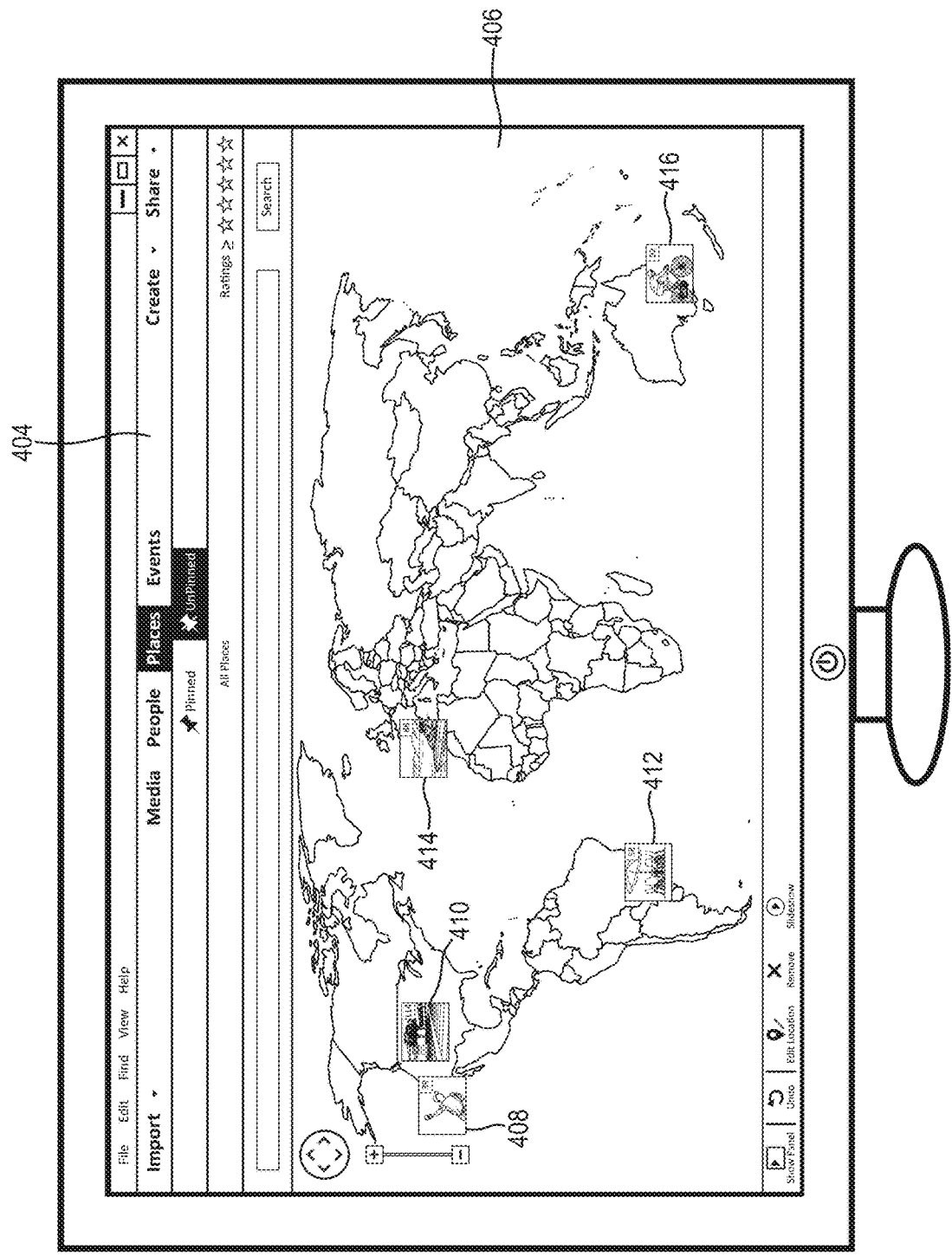
FIG. 4A illustrates a computing device displaying a user interface comprising a digital map and visual representations of a plurality of digital media items in accordance with one or more embodiments.
Figure 4B:
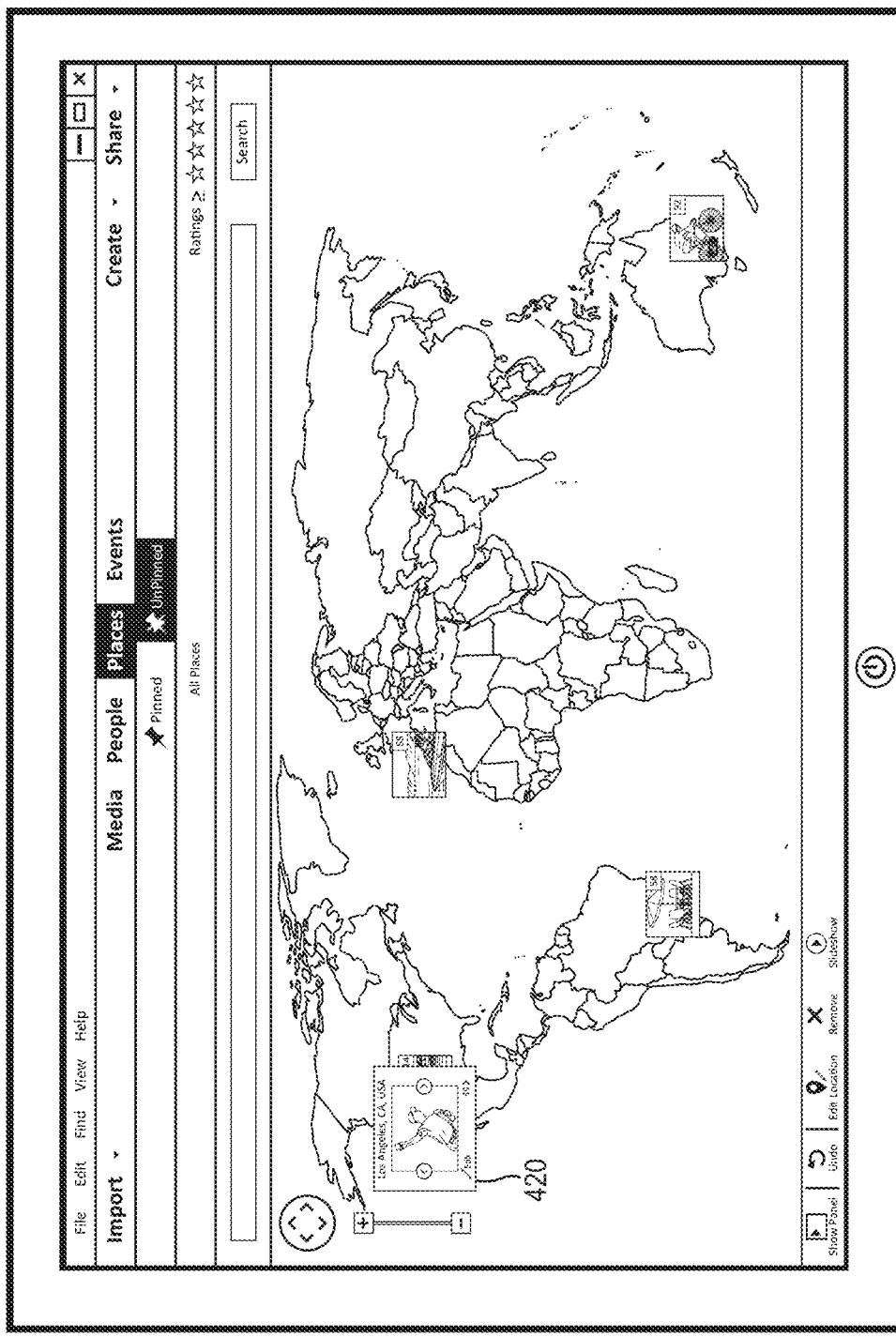
FIG. 4B illustrates the computing device of FIG. 4A and a digital image control for reviewing a plurality of digital media items in accordance with one or more embodiments.

In addition to applying geo-tags to digital images, as mentioned previously, in one or more embodiments, the digital geo-tagging system utilizes geo-tags to identify and/or search for digital images. For example, FIGS. 4A-4B illustrate utilizing geo-tags in conjunction with a digital map to search for and identify digital images. In particular, FIG. 4A illustrates the computing device 100 with a user interface 404 corresponding to the digital image management application 106. The user interface 404 includes a digital map 406 displaying visual representations 408-416. The visual representations 408-416 represent clusters of digital images with geo-tags corresponding to the location of each visual representation on the digital map 406. For example, the visual representation 408 corresponds to the first cluster 210 with geo-tags identifying Los Angeles, Calif. from FIG. 2B. Similarly, the visual representation 410 corresponds to the visual representation 340 and the first cluster 310 with geo-tags identifying Denver, Colo. from FIGS. 3C-3D.

The digital geo-tagging system generates the digital map 406 and the visual representations 408-416 by searching a repository of digital images, identifying geo-tags corresponding to the digital images, and generating the visual representations 408-416 corresponding to the locations corresponding to the geo-tags. Accordingly, a user searching for digital images can utilize the user interface 404 and the visual representations 408-416 to identify a particular digital image. For example, a user that remembers taking a particular picture in Los Angeles, can select one the visual representation 408 and search digital images with geo-tags corresponding to Los Angeles.

For example, FIG. 4B illustrates the user interface 404 upon selection of the visual representation 408. The digital geo-tagging system provides a digital image control 420 that allows for navigating digital images with a geo-tag corresponding to Los Angeles, Calif. In this manner, a user can intuitively and easily review digital images captured at various locations.

In addition to searching for digital images utilizing the digital map 406, the digital geo-tagging system can also conduct searches for digital images utilizing geo-tags in a variety of other ways. For example, the digital geo-tagging system can receive a keyword search comprising a particular location and the digital geo-tagging system can identify and display digital images with geo-tags corresponding to the particular location.

Figure 5:
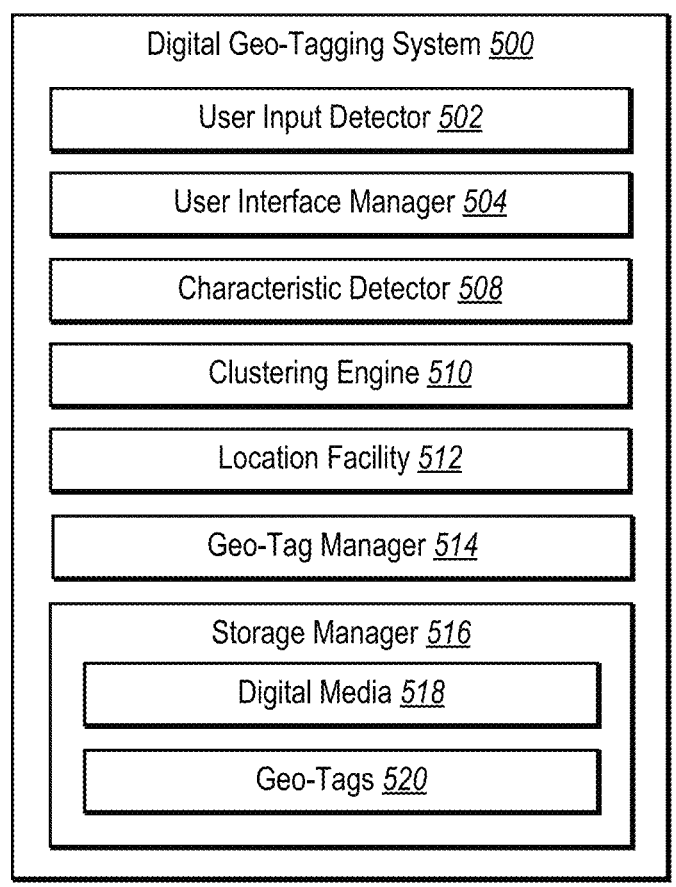
FIG. 5 illustrates a schematic diagram of a digital geo-tagging system in accordance with one or more embodiments.

Turning now to FIG. 5, additional detail is provided regarding components and capabilities of one embodiment of the digital geo-tagging system. In particular, FIG. 5 illustrates an embodiment of an exemplary digital geo-tagging system 500 (e.g., the digital geo-tagging system described above). As shown, the geo-digital geo-tagging system 500 may include, but is not limited to a user input detector 502, a user interface manager 504, a characteristic detector 508, a clustering engine 510, a location facility 512, a geo-tag manager 514, and a storage manager 516 (comprising digital media 518 and geo-tags 520).

As just mentioned, and as illustrated in FIG. 5, the digital geo-tagging system 500 includes the user input detector 502. The user input detector 502 detects, identifies, monitors, receives, processes, captures, and/or records various types of user input. For example, the user input detector 502 detects one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 502 operates in conjunction with any number of user input devices or computing devices (in isolation or in combination), including personal computers, laptops, smartphones, smart watches, tablets, touchscreen devices, televisions, personal digital assistants, mouse devices, keyboards, track pads, or stylus devices. The user input detector 502 detects and identifies various types of user interactions with user input devices, such as select events, drag events, scroll events, release events, and so forth. For example, in the event a client device corresponding to the geo-digital geo-tagging system 500 includes a touch screen, the user input detector 502 detects one or more touch gestures (e.g., swipe gestures, tap gestures, pinch gestures, or reverse pinch gestures) from a user that forms a user interaction.

The user input detector 502 communicates with, and thus detects user input with respect to a variety of programs, applications, plug-ins, operating systems, user interfaces, or other implementations in software or hardware.

As just mentioned, and as illustrated in FIG. 5, the digital geo-tagging system 500 also includes the user interface manager 504. The user interface manager 504 provides, manages, and/or controls a graphical user interface (or simply "user interface") for use with the digital geo-tagging system 500. In particular, the user interface manager 504 can facilitate presentation of information by way of an external component of a client device (e.g., the computing device 100). For example, the user interface manager 504 can display a user interface by way of a display screen associated with a client device. The user interface may be composed of a plurality of graphical components, objects, and/or elements that allow a user to perform a function. The user interface manager 504 presents, via a client device, a variety of types of information, including text, images, video, audio, characters, or other information. Moreover, the user interface manager 504 provides a variety of user interfaces specific to any variety of functions, programs, applications, plug-ins, devices, operating systems, and/or components of a client device 402 (e.g., the user interfaces 104 or 404).

The user interface manager 504 can provide a user interface with regard to a variety of operations or applications (e.g., the digital media management application 106). For example, the user interface manager 504 provides a user interface that facilitates creating, editing, modifying, storing, uploading, and managing electronic digital media (i.e., digital videos and digital images). Similarly, the user interface manager 504 can generate a user interface that facilitates identifying, searching, and utilizing digital media. Additional details with respect to various example user interface elements are described throughout with regard to various embodiments containing user interfaces.

As illustrated in FIG. 5, in addition, the digital geo-tagging system 500 can also include the characteristic detector 508. The characteristic detector 508 can determine, identify, receive, or detect one or more characteristics of digital media. In particular, in one or more embodiments, the characteristic detector 508 can identify digital media in a repository of digital media (e.g., the digital media 518) and determine characteristics corresponding to the digital media. For example, in one or more embodiments, the characteristic detector 508 can determine a time corresponding to digital media. In particular, the characteristic detector 508 can determine a time that digital media was captured, saved, and/or created. For example, the characteristic detector 508 can identify time stamps corresponding to one or more digital media items.

In addition, the characteristic detector 508 can detect a variety of other characteristics as described above. For example, the characteristic detector 508 can include a facial or object recognition algorithm that can identify individuals or items portrayed in digital media. Similarly, the characteristic detector 508 can detect a variety of color properties corresponding to digital media, such as hue, tint, saturation, or brightness.

As illustrated in FIG. 5, the digital geo-tagging system 500 also includes the clustering engine 510. The clustering engine 510 can group, organize, arrange, gather, categorize, segregate, cluster, or sort a plurality of objects. In particular, the clustering engine 510 can group a plurality of digital media items (e.g., from the digital media 518) into clusters based on one or more common characteristics (i.e., characteristics identified by the characteristic detector 508).

For example, in one or more embodiments, the clustering engine 510 generates clusters based on common characteristics utilizing a clustering algorithm and one or more cluster parameters. For example, the clustering engine 510 can cluster digital media based on time (or other characteristic) corresponding to the digital media. More specifically, the clustering engine 510 can utilize a k-means clustering algorithm and a k-value to generate clusters of digital images.

The clustering engine 510 can modify clusters of digital media. For example, the clustering engine 510 can identify modifications to a cluster parameter via user input from a cluster adjustment control generated as part of a user interface. Similarly, as mentioned previously, the clustering engine 510 can select one or more cluster parameters (e.g., a k-value) based on various characteristics. Moreover, as the digital geo-tagging system applies geo-tags to digital media (e.g., via the geo-tag manager 514), the clustering engine 510 can iteratively generate clusters to remaining digital media items that do not have geo-tags.

In addition, as illustrated in FIG. 5, the digital geo-tagging system 500 also includes the location facility 512. The location facility 512 can determine, detect, identify, and/or receive a location corresponding to digital media. In particular, the location facility 512 can determine a location where digital media was captured.

In one or more embodiments, the location facility 512 determines a location based on user input. For example, the location facility 512 can determine a location based on user input with a location selection control and/or a digital map. Specifically, a user can enter a location via a location selection control and/or a user can drag and drop digital media items (i.e., clusters) to a location on a digital map.

In one or more embodiments, the location facility 512 can interact with a remote server to identify or receive location information. For example, in one or more embodiments, the location facility 512 can send a call to an API hosted on a remote server. Specifically, the location facility 512 can send a call that includes search keywords, GPS data (e.g., latitude and longitude data) or other information. Moreover, the location facility 512 can receive, via the API, location information. For example, the location facility 512 can receive location information (e.g., GPS or names of a location) in response to search keywords. Similarly, the location facility 512 can receive names of a location (including various levels of specificity), in response to sending GPS information (e.g., latitude and longitude coordinates). The location facility 512 can also generate digital maps. For example, the location facility 512 can generate digital maps corresponding to an identified location corresponding to one or more digital images.

In addition to identifying location based on user input, the location facility 512 can also determine a location corresponding to digital media items based on a variety of other sources. For example, the location facility 512 can determine a location corresponding to a first digital media item based on a geo-tag corresponding to a second digital media item (e.g., a second digital media item in the same cluster as the first digital media item). Similarly, the location facility 512 can determine a location based on items or individuals portrayed in a digital image. Moreover, the location facility 512 can determine a location based on one or more additional users. For instance, the location facility 512 can determine a location based on geo-tags corresponding to digital images of another related user (e.g., a friend, colleague, or family member).

As shown in FIG. 5, in addition to the location facility 512, the digital geo-tagging system 500 also includes the geo-tag manager 514. The geo-tag manager 514 can generate, create, apply, or modify one or more geo-tags. In particular, the geo-tag manager 514 can apply geo-tags to one or more digital media items (i.e., clusters). As mentioned previously, the geo-tag manager 514 can apply geo-tags to metadata corresponding to digital media items (e.g., such that the geo-tags are permanently stored with the digital media item). In addition, the geo-tag manager 514 can apply geo-tags to a database specific to the digital geo-tagging system 500. For example, the geo-tag manager 514 can associate a geo-tag to a digital media item in a database specific to the digital media management application 106 such that the geo-tag is available only via the digital media management application 106.

As shown in FIG. 5, the digital geo-tagging system 500 also includes the storage manager 516. The storage manager 516 maintains data for the digital geo-tagging system 500. The storage manager 516 maintains data as necessary to perform the functions of the digital geo-tagging system 500. As illustrated, the storage manager 516 includes digital media 518. Digital media 518 includes digital videos and/or digital images. For example, digital media 518 can include digital videos and/or digital images associated with a particular account (e.g., an account associated with a user or computing device). Digital media 518 can also include digital videos and/or digital images associated with other user accounts. For example, digital media 518 can comprise digital images associated with a plurality of user accounts stored on a remote server. In addition, the storage manager 516 also includes geo-tags 520. The geo-tags 520 can comprise metadata corresponding to the digital media 518. Moreover, the geo-tags 520 can comprise a database associating a plurality of digital media items with corresponding location information.

Each of the components 502-516 of the digital geo-tagging system 500 and their corresponding elements (as shown in FIG. 5) may be in communication with one another using any suitable communication technologies. It will be recognized that although components 502-516 of the digital geo-tagging system 500 and their corresponding elements are shown to be separate in FIG. 5, any of components 502-516 and their corresponding elements may be combined into fewer components, such as into a single facility or module, divided into more components, or configured into different components as may serve a particular embodiment.

The components 502-516 of the digital geo-tagging system 500 and their corresponding elements can comprise software, hardware, or both. For example, the components 502-516 and their corresponding elements can comprise one or more instructions stored on a computer-readable storage medium and executable by processors of one or more computing devices. When executed by the one or more processors, the computer-executable instructions of the digital geo-tagging system 500 can cause a client device and/or a server device to perform the methods described herein. Alternatively, the components 502-516 and their corresponding elements can comprise hardware, such as a special purpose processing device to perform a certain function or group of functions. Additionally, the components 502-516 and their corresponding elements can comprise a combination of computer-executable instructions and hardware.

Figure 6:
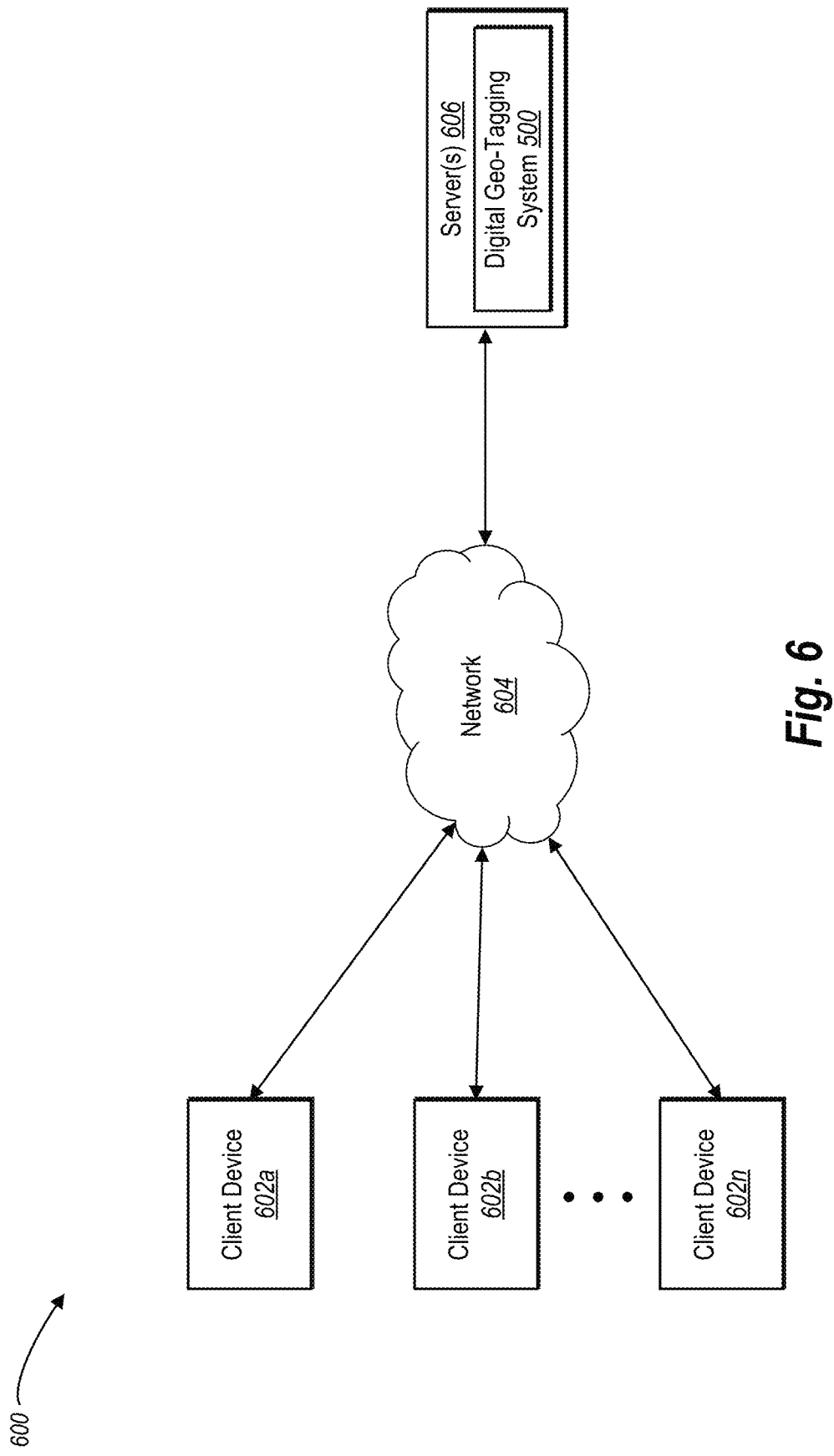
FIG. 6 illustrates a schematic diagram of an exemplary environment in which the digital geo-tagging system can operate in accordance with one or more embodiments.

FIG. 6 illustrates a schematic diagram of one embodiment of an exemplary environment 600 in which the digital geo-tagging system 500 can operate. In one or more embodiments, the exemplary environment 600 includes one or more client devices 602a, 602b, . . . 602n, a network 604, and server(s) 606. The network 604 may be any suitable network over which the computing devices can communicate. Example networks are discussed in more detail below with regard to FIG. 10.

As illustrated in FIG. 6, the environment 600 may include client devices 602a-602n. The client devices 602a-602n may comprise any computing device. For instance, in one or more embodiments, one or more of the client devices 602a-602n comprise the computing device 100. In addition, the environment 600 may also include the server(s) 606. The server(s) 606 may generate, store, receive, and transmit any type of data, including digital media 518 and/or geo-tags 520. For example, the server(s) 606 may transmit data to a client device, such as the client device 602a. The server(s) 606 can also transmit electronic messages between one or more users of the environment 600. In one example embodiment, the server(s) 606 comprise a content server. The server(s) 606 can also comprise a communication server or a web-hosting server. Additional details regarding the server(s) 606 will be discussed below with respect to FIG. 10.

As illustrated, in one or more embodiments, the server(s) 606 can include the digital geo-tagging system 500. In particular, the digital geo-tagging system 500 can comprise an application running on the server(s) 606 or a portion of a software application that can be downloaded from the server(s) 606. For example, the digital geo-tagging system 500 can include a web hosting application that allows the client devices 602a-602n to interact with content hosted at the server(s) 606. To illustrate, in one or more embodiments of the exemplary environment 600, one or more client devices 602a-602n can access a webpage supported by the server(s) 606. In particular, the client device 602a can run a web application (e.g., a web browser) to allow a user to access, view, and/or interact with a webpage or website hosted at the server(s) 606.

Although FIG. 6 illustrates a particular arrangement of the client devices 602a-602n, the network 604, and the server(s) 606, various additional arrangements are possible. For example, while FIG. 6 illustrates multiple separate client devices 602a-602n communicating with the server(s) 606 via the network 604, in one or more embodiments a single client device may communicate directly with the server(s) 606, bypassing the network 604.

Similarly, although the environment 600 of FIG. 6 is depicted as having various components, the environment 600 may have additional or alternative components. For example, the digital geo-tagging system 500 can be implemented on a single computing device. In particular, the digital geo-tagging system 500 may be implemented in whole by the client device 602a (e.g., the client device 602a may comprise the computing device 100) or the digital geo-tagging system 500 may be implemented in whole by the server(s) 606. Alternatively, the digital geo-tagging system 500 may be implemented across multiple devices or components (e.g., utilizing the client devices 602a-602n and the server(s) 606).

By way of example, in one or more embodiments, the server(s) 606 maintain a repository of digital media (e.g., digital media 518) on behalf of a user associated with the client device 602a. The client device 602a can access the server(s) 606 via a digital media management application (e.g., the digital media management application 106) and the server(s) 606 can provide all or a portion of the repository of digital media to the client device 602a (e.g., provide for display via the user interface manager 504). Moreover, the server(s) 606 can identify a plurality of digital media items from the repository of digital images lacking geo-tags (e.g., via the characteristic detector 508). The server(s) 606 can determine one or more characteristics of the plurality of digital media items (e.g., identify time stamps corresponding to the plurality of digital media items via the characteristic detector 508). Moreover, the server(s) 606 can group the plurality of digital media items into clusters based on the detected characteristics (e.g., via the clustering engine 510) and utilizing a clustering algorithm with a cluster parameter. The server(s) 606 can provide the clusters to the client device 602a (e.g., provide visual representations of the clusters for display).

Moreover, the client device 602a can receive user input (e.g., via the user input detector 502) modifying the cluster parameter and the client device 602a can send the modified cluster parameter to the server(s) 606. The server(s) 606 can regroup the plurality of digital images into modified clusters (e.g., via the clustering engine 510) based on the modified cluster parameter and send the modified clusters to the client device 602a.

Furthermore, the client device 602a can receive additional user input in relation to a cluster and a location. The client device 602 a can send an indication of the cluster and the location to the server(s) 606. Based on the indication of the cluster and the location, the servers(s) 606 can apply a geo-tag corresponding to the location to the digital images of the indicated cluster (e.g., via the geo-tag manager 514).

Thereafter, the server(s) 606 can group the remaining digital images without geo-tags into further modified clusters. The server(s) 606 can send the further modified clusters to the client device 602a for further user review. For example, the client device 602a can receive additional user input of a second cluster from the further modified clusters and a location. Moreover, the server(s) 606 can apply geo-tags to digital images of the second cluster.

The server(s) 606 can also search the repository of digital media and identify digital media based on applied geo-tags. For example, the client device 602a can send a request for digital images captured at a particular location. The server(s) 606 can search geo-tags for digital images corresponding to the particular location. The server(s) 606 can send digital images matching the particular location to the client device 602a.

In one or more embodiments, the server(s) 606 can maintain and gather information with regard to digital media items corresponding to a plurality of users. For example, the server(s) 606 can maintain digital images captured by a plurality of users and associated with a plurality of accounts. In one or more embodiments, the server(s) 606 can utilize information from a first account to apply a geo-tag with regard to a second account.

For example, the server(s) 606 can determine a correspondence between a first account and a second account (e.g., the two accounts each provide permissions to share information between the two accounts). Moreover, the server(s) 606 can identify characteristics (e.g., a time stamp or geo-tag) from a digital media in the first account and utilize the identified characteristics to apply a geo-tag in the second account. Specifically, the server(s) 606 can determine that two individuals attended the same event at the same time. The server(s) 606 can identify a first geo-tag from a digital image corresponding to the first account and utilize the first geo-tag to apply a second geo-tag to a cluster in a second account.

Figure 7:
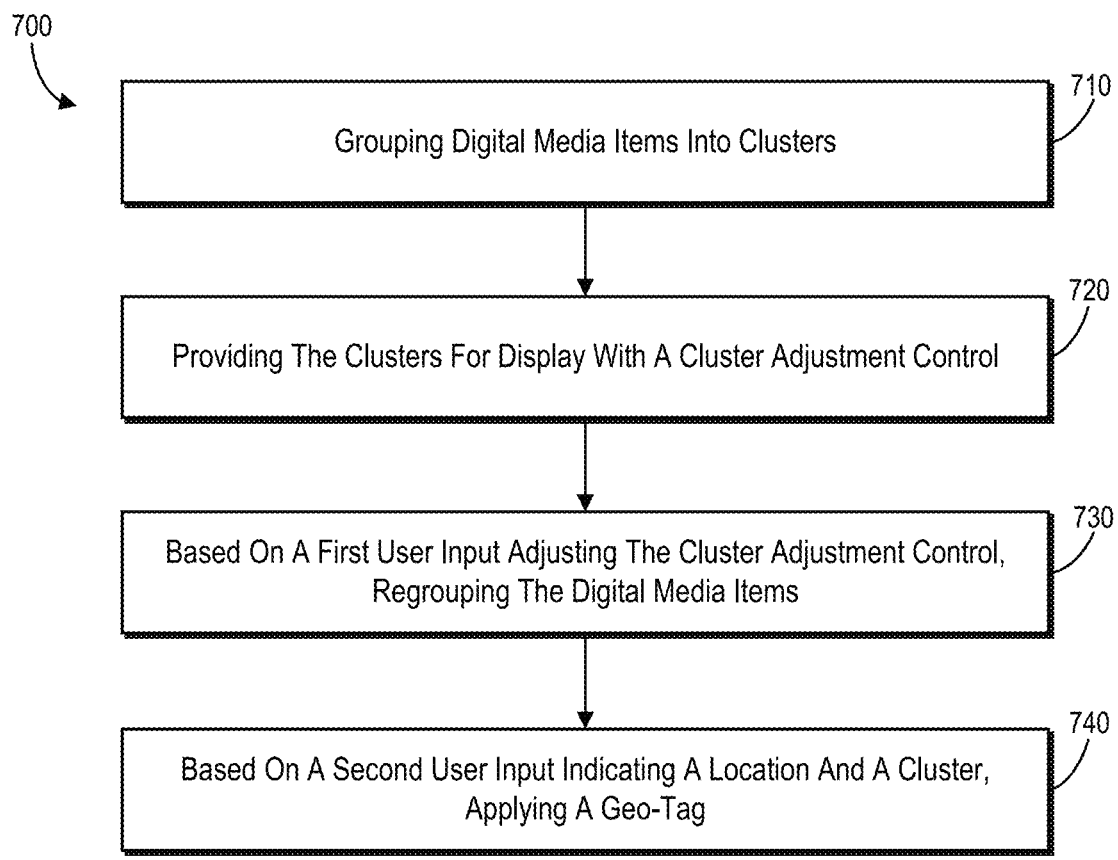
FIG. 7 illustrates a flowchart of a series of acts in a method of applying geo-tags to digital media items in accordance with one or more embodiments.
Figure 8:
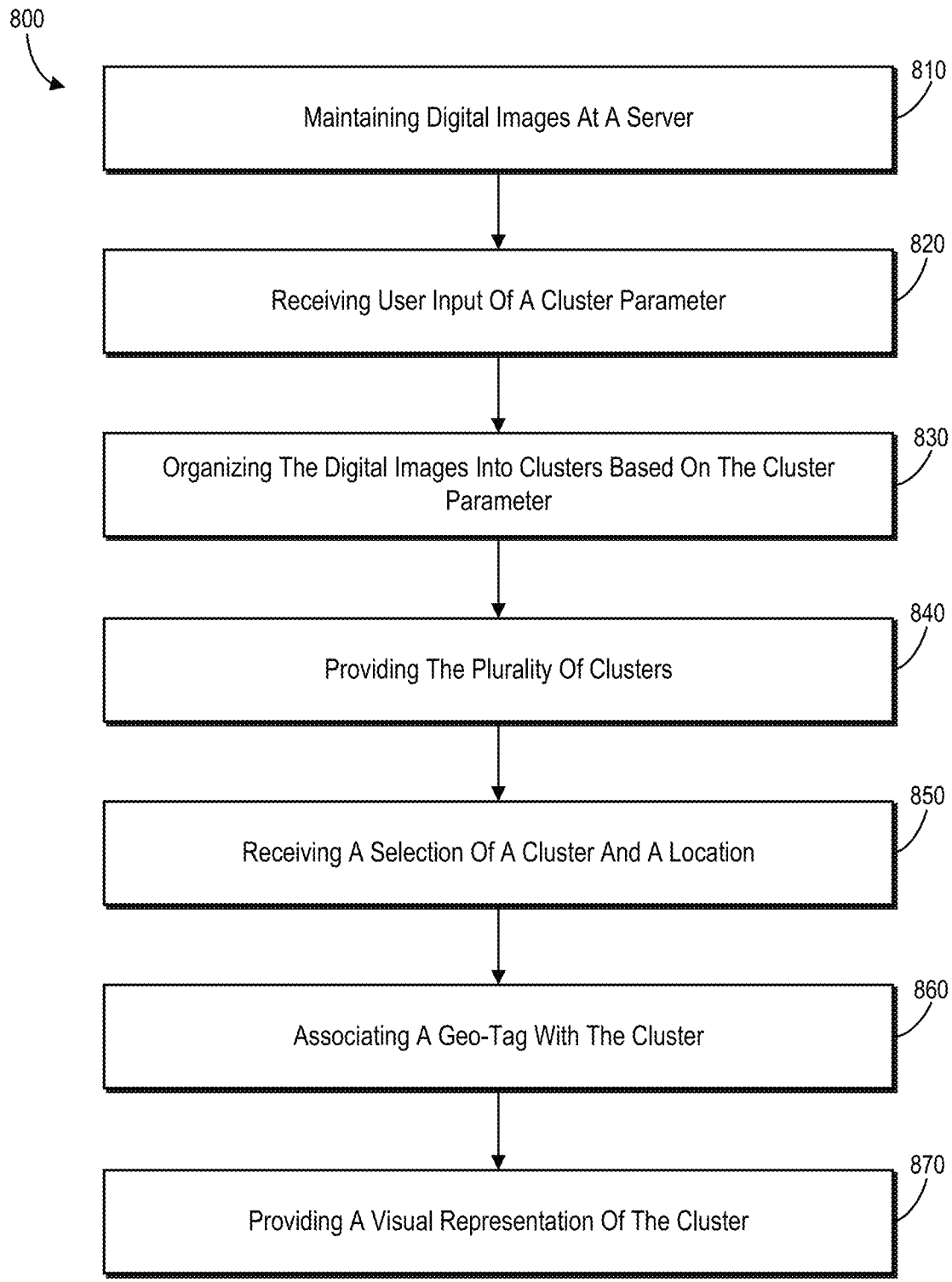
FIG. 8 illustrates a flowchart of a series of acts in another method of applying geo-tags to digital media items in accordance with one or more embodiments.
Figure 9:
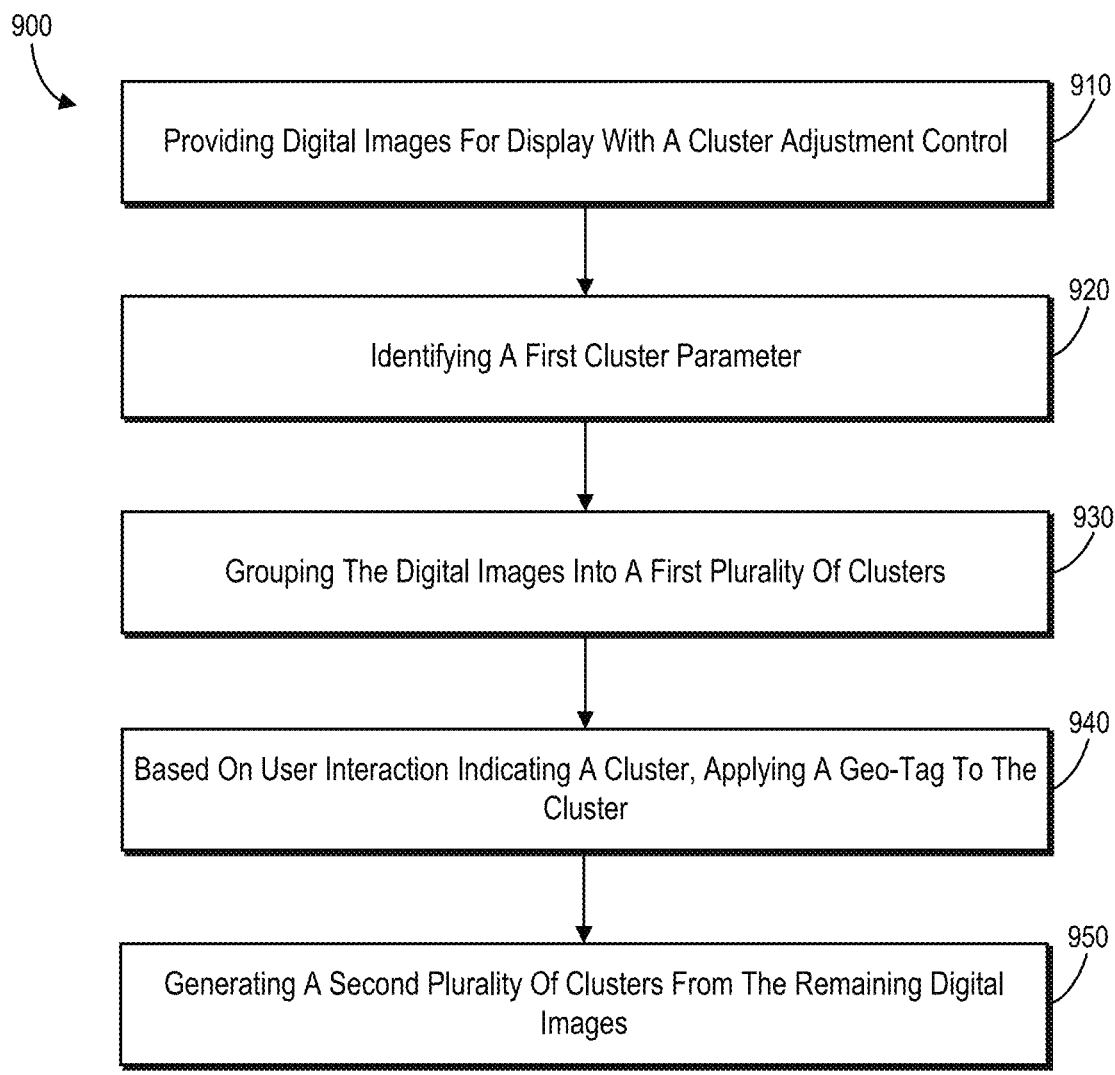
FIG. 9 illustrates flowchart of a series of acts in yet another method of applying geo-tags to digital media items in accordance with one or more embodiments.

FIGS. 1A-6, the corresponding text, and the examples, provide a number of different systems and devices that generate geo-tags for digital images. In addition to the foregoing, embodiments can also be described in terms of flowcharts comprising acts and steps in a method for accomplishing a particular result. For example, FIGS. 7-9 illustrate flowcharts of exemplary methods in accordance with one or more embodiments. The methods described in relation to FIGS. 7-9 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method 700 of applying geo-tags to digital images in accordance with one or more embodiments. In one or more embodiments, the method 700 is performed in a digital medium environment that includes the digital geo-tagging system 500. The method 700 is intended to be illustrative of one or more methods in accordance with the present disclosure, and is not intended to limit potential embodiments. Alternative embodiments can include additional, fewer, or different steps than those articulated in FIG. 7.

As illustrated in FIG. 7, the method 700 includes an act 710 of grouping digital media items into clusters. In particular, the act 710 can include grouping, by at least one processor, a plurality of digital media items into a first plurality of clusters. For example, in one or more embodiments, the act 710 includes applying a clustering algorithm with a first clustering parameter to group the digital media items. Moreover, the act 710 includes applying a clustering algorithm with a first clustering parameter to group the digital media items based on a first position of a cluster adjustment control (e.g., a slider element).

As shown in FIG. 7, the method 700 also includes an act 720 of providing the clusters for display with a cluster adjustment control. In particular, the act 720 includes providing, by the at least one processor, the first plurality of clusters for display via a user interface, the user interface comprising a cluster adjustment control. As mentioned, in one or more embodiments, the cluster adjustment control is a slider element capable of modifying a cluster parameter utilized to group the plurality of digital media items into the first plurality of clusters.

In addition, as shown in FIG. 7, the method 700 also include an act 730 of, based on a first user input adjusting the cluster adjustment control, regrouping the digital media items. In particular the act 730 includes, based on a first user input adjusting the cluster adjustment control, regrouping, by the at least one processor, the plurality of digital media items into a second plurality of clusters. For example, in one or more embodiments, the act 730 comprises using a clustering algorithm to create clusters of digital media items with common characteristics, the common characteristics comprising time stamps that fall within a threshold period of time.

In one or more embodiments, the act 730 comprises, based on the first user input adjusting the cluster adjustment control, identifying a second position of the slider element and modifying the first clustering parameter to a second clustering parameter corresponding to the second position; and applying the clustering algorithm with the second clustering parameter corresponding to the second position of the slider element to regroup the digital media items.

Moreover, as illustrated in FIG. 7, the method 700 also include an act 740 of, based on a second user input indicating a location and a cluster, applying a geo-tag. In particular, the act 740 includes based on a second user input indicating a location and a cluster from the second plurality of clusters, applying a geo-tag to each digital media item in the cluster corresponding to the location. For example, in one or more embodiments, the second user input comprises selection of the cluster and selection of the location via a location selection control provided in conjunction with a digital map via the user interface. In addition, in one or more embodiments, the second user input comprises clicking on the cluster and dragging the cluster to the location on the digital map provided in the user interface.

Furthermore, in one or more embodiments, the act 700 includes conducting a search of the plurality of digital media items based on the location; identifying digital media items from the plurality of digital media items with geo-tags corresponding to the location; and providing the identified digital media items for display in conjunction with the location. Moreover, in one or more embodiments, the act 700 includes determining four levels of location information corresponding to the location; and generating the geo-tag based on the determined four levels of location information corresponding to the location. For instance, determining four levels of location information can comprise sending a call comprising the indicated location to an API; and in response to the call, receiving additional location information comprising the four levels of location information.

In addition, FIG. 8 illustrates another flowchart of a series of acts in a method 800 of generating geo-tags in accordance with one or more embodiments. As shown, the method 800 can include an act 810 of maintaining digital images at a server. In particular, the act 810 includes maintaining a plurality of digital images at the server, each digital image comprising a time stamp. Moreover, in one or more embodiments, each of the plurality of digital images lack a geo-tag corresponding to the location (e.g., prior to organizing the plurality of digital images into a plurality of clusters, the plurality of digital images do not have a geo-tag).

As illustrated in FIG. 8, the method 800 also includes an act 820 of receiving user input of a cluster parameter. In particular, the act 820 includes receiving user input of a cluster parameter from a remote client device. For example, in one or more embodiments, the cluster parameter comprises a k-value of a k-means clustering algorithm.

In one or more embodiments, the act 820 also includes identifying a cluster parameter for clustering the plurality of digital images. For example, as mentioned above, the act 820 can include identifying a cluster parameter based on user input (e.g., user interaction with a cluster adjustment control). Furthermore, the act 820 can include selecting a cluster parameter based on one or more factors, without user input.

As shown in FIG. 8, the method 800 also includes an act 830 of organizing the digital images into clusters based on the cluster parameter. In particular, the act 830 includes organizing the plurality of digital images into a plurality of clusters based on the cluster parameter and the time stamps corresponding to the plurality of digital images.

Moreover, as illustrated in FIG. 8, the method 800 also includes an act 840 of providing the plurality of clusters. In particular, the act 840 includes providing the plurality of clusters to the remote client device for display. For example, the act 840 can include providing a visual representation of the plurality of clusters to the remote client device.

In addition, as shown in FIG. 8, the method 800 also includes an act 850 of receiving a selection of a cluster and a location. In particular, the act 850 includes receiving user input comprising a selection of a cluster from the plurality of clusters and a location. For example, in one or more embodiments, receiving user input comprising a selection of the location comprises receiving a latitude and longitude corresponding to the location.

Furthermore, as illustrated in FIG. 8, the method 800 also include an act 860 of associating a geo-tag with the cluster. In particular, the act 860 includes, based on the user input, associate a geo-tag corresponding to the location with each digital image in the cluster. For example, in one or more embodiments, the act 860 includes maintaining a database associating digital images with corresponding geo-tags within the system; modifying the database to add the geo-tag and each digital image in the cluster; and controlling access to the modified database such that only the system can identify the location corresponding to each digital image in the database.

As shown in FIG. 8, the method 800 also includes an act 870 of providing a visual representation of the cluster. In particular, the act 870 includes providing a visual representation of the digital images of the cluster and the location for display to the remote client device.

In one or more embodiments, the method 800 also includes receiving user input of a second cluster parameter from the remote client device after associating the geo-tag corresponding to the location with each digital image in the cluster; and organizing a remaining plurality of digital images without geo-tags into a third plurality of clusters based on the second cluster parameter and time stamps corresponding to the remaining plurality of digital images without geo-tags.

In addition, FIG. 9 illustrates another flowchart of a series of acts in a method 900 of generating geo-tags in accordance with one or more embodiments. As shown, the method 900 includes an act 910 of providing digital images for display with a cluster adjustment control. In particular, the act 910 includes providing for display, via user interface, a plurality of digital images together with a cluster adjustment control.

As illustrated in FIG. 9, the method 900 also includes an act 920 of identifying a first cluster parameter. In particular, the act 920 includes identifying, by at least one processor, a first cluster parameter based on user interaction with the cluster adjustment control. For example, in one or more embodiments, the cluster adjustment control is a slider element capable of modifying the first cluster parameter.

As shown in FIG. 9, the method 900 also includes an act 930 of grouping the digital images into a first plurality of clusters. In particular, the act 930 includes grouping, by the at least one processor, the plurality of digital images into a first plurality of clusters based on the first cluster parameter and digital time stamps corresponding to each digital image in the first plurality of clusters.

In addition, as illustrated in FIG. 9, the method 900 also include an act 940 of, based on user interaction indicating a cluster, applying a geo-tag to the cluster. In particular, the act 940 includes based on user interaction with a cluster from the first plurality of clusters indicating a location, modifying metadata of each digital image in the cluster to include a geo-tag corresponding to the location. For example, in one or more embodiments, the act 940 includes identifying a geo-tag with regard to at least one digital image in the cluster; and determining based on the geo-tag that the at least one digital image corresponds to the location.

Moreover, as shown in FIG. 9, the method 900 also includes an act 950 of generating a second plurality of clusters from the remaining digital images. In particular, the act 950 includes upon modifying the metadata of each of the digital images in the cluster, generating a second plurality of clusters from the remaining plurality of digital images. For example, in one or more embodiments, the act 950 includes selecting a second cluster parameter different from the first cluster parameter without user input. Moreover, the act 950 can include utilizing the geo-tag associated with the at least one digital image corresponding to the location to apply one or more geo-tags to each of the digital images in the cluster corresponding to the location.

In addition, in one or more embodiments, the method 900 also includes identifying a third cluster parameter based on user interaction with the cluster adjustment control; and regrouping the plurality of digital images into a third plurality of clusters based on the third cluster parameter.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
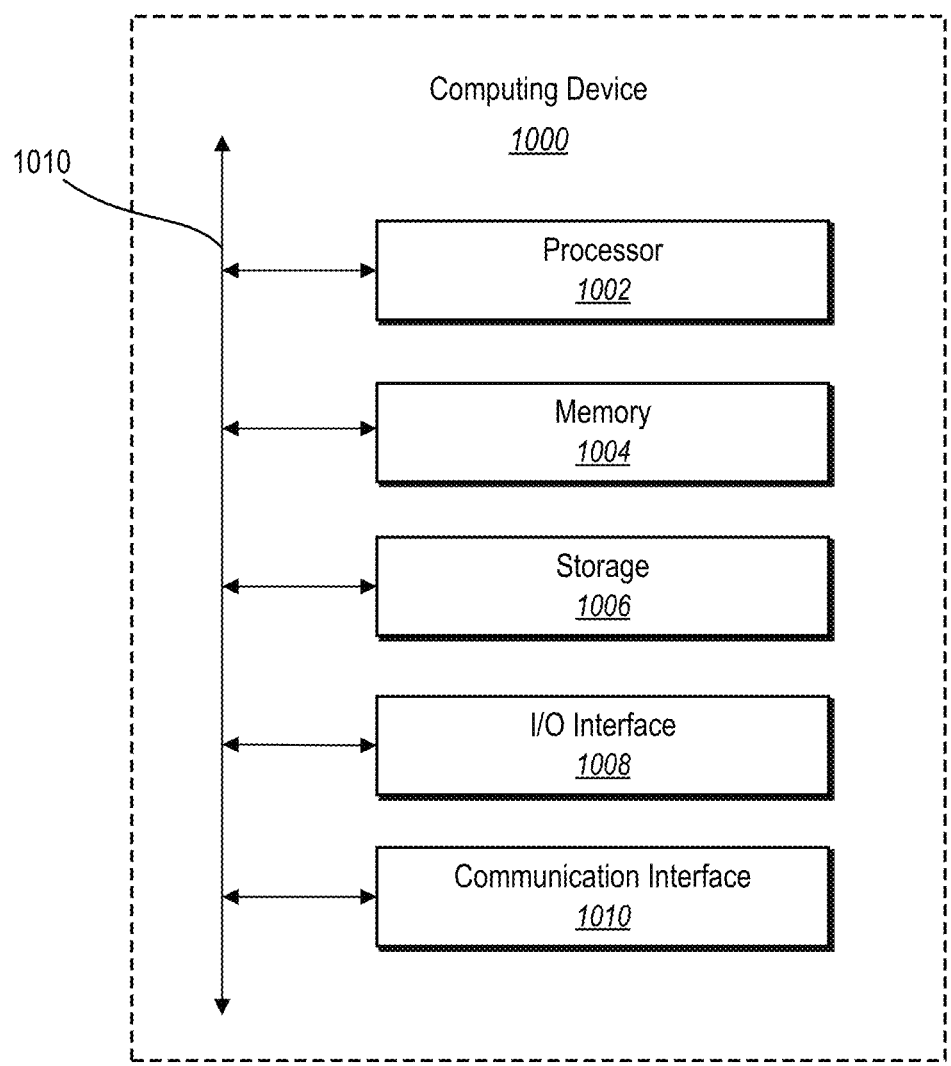
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that the digital geo-tagging system 500 can comprise implementations of the computing device 1000. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment for managing digital media, a method of efficiently identifying and applying location information to the digital media, comprising:
grouping, by at least one processor, a plurality of digital media items into a first plurality of clusters;
providing, by the at least one processor, the first plurality of clusters for display via a user interface, the user interface comprising a cluster adjustment control and a location selection control, wherein the location selection control comprises an interactive digital map;
based on a first user input adjusting the cluster adjustment control, regrouping, by the at least one processor, the plurality of digital media items into a second plurality of clusters by:
determining time gaps between the plurality of digital media items;
sorting the time gaps into a sequential list based on size of the time gaps;
identifying a number of time gaps to satisfy a threshold time difference by adding time gaps to the number of time gaps based on the sequential list; and
generating the second plurality of clusters based on the number of time gaps; and
applying a geo-tag of a location to each digital media item in a cluster from the second plurality of clusters in response to identifying a second user input comprising a user selection of the cluster from the second plurality of clusters and a user selection of the location via the interactive digital map of the location selection control; and
providing the cluster for display at the location on the interactive digital map of the location selection control.

2. The method of claim 1, further comprising identifying a selection event corresponding to the cluster, a drag event corresponding to the cluster, and a drop event corresponding to the cluster at the location on the interactive digital map to apply the geo-tag.

3. The method of claim 1, wherein the cluster adjustment control is a slider element capable of modifying a cluster parameter utilized to group the plurality of digital media items into the first plurality of clusters.

4. The method of claim 3, wherein grouping the plurality of digital media items into the first plurality of clusters comprises applying a clustering algorithm with a first clustering parameter to group the digital media items based on a first position of the slider element.

5. The method of claim 4, wherein regrouping the plurality of digital media items into the second plurality of clusters comprises:
based on the first user input adjusting the cluster adjustment control, identifying a second position of the slider element and modifying the first clustering parameter to a second clustering parameter corresponding to the second position; and
applying the clustering algorithm with the second clustering parameter corresponding to the second position of the slider element to regroup the digital media items.

6. The method of claim 1, further comprising providing the cluster for display at the location on the interactive digital map of the location selection control together with another cluster at another location on the interactive digital map of the location selection control.

7. The method of claim 1, further comprising:
conducting a search of the plurality of digital media items based on the location;
identifying digital media items from the plurality of digital media items with geo-tags corresponding to the location; and
providing the identified digital media items for display in conjunction with the location.

8. The method of claim 1, further comprising:
upon applying the geo-tag, identifying a subset of digital media items from the plurality of digital media items, the subset of digital media items excluding the cluster; and
based on a third user input via the cluster adjustment control, grouping the subset of digital media items into a third plurality of clusters.

9. The method of claim 8, further comprising applying an additional geo-tag to each digital media item in an additional cluster from the third plurality of clusters based on a fourth user input comprising a user selection of the additional cluster from the third plurality of clusters and a user selection of an additional location via the interactive digital map of the location selection control.

10. A system comprising:
at least one server; and
at least one non-transitory computer readable storage medium storing instructions that, when executed by the at least one server cause the system to:
provide a user interface for display via a remote client device, the user interface comprising a cluster adjustment control and a location selection control, wherein the location selection control comprises an interactive digital map;
based on user input via the cluster adjustment control, organize a plurality of digital images into a plurality of clusters by:
determining time gaps between the plurality of digital images;
sorting the time gaps into a sequential list based on size of the time gaps;
identifying a number of time gaps to satisfy a threshold time difference by adding time gaps to the number of time gaps based on the sequential list; and
generating the plurality of clusters based on the number of time gaps;
provide a modified user interface for display via the remote client device, the modified user interface comprising the plurality of clusters, the cluster adjustment control, and the location selection control comprising the interactive digital map;
apply a geo-tag of a location to each digital image in a cluster from the plurality of clusters in response to identifying a second user input comprising a user selection of the cluster from the plurality of clusters and a user selection of the location via the interactive digital map; and
provide, for display at the remote client device, a visual representation of the digital images of the cluster at the location on the interactive digital map of the location selection control.

11. The system of claim 10, further comprising instructions that, when executed by the at least one server, cause the system to identify a selection event corresponding to the cluster, a drag event corresponding to the cluster, and a drop event corresponding to the cluster at the location on the interactive digital map to apply the geo-tag.

12. The system of claim 10, further comprising instructions that, when executed by the at least one server, cause the system to receive user input of a second cluster parameter from the remote client device after associating the geo-tag corresponding to the location with each digital image in the cluster.

13. The system of claim 12, further comprising instructions that, when executed by the at least one server, cause the system to organize a remaining plurality of digital images without geo-tags into a third plurality of clusters based on the second cluster parameter and time stamps corresponding to the remaining plurality of digital images without geo-tags.

14. The system of claim 10, wherein each of the plurality of digital images lack a geo-tag corresponding to the location prior to organizing the plurality of digital images into a plurality of clusters.

15. A non-transitory computer-readable medium storing instructions thereon that, when executed by at least one processor, causes the at least one processor to:
provide for display, via a user interface, a plurality of digital images together with a cluster adjustment control and a location selection control, wherein the location selection control comprises an interactive digital map;
based on user interaction with the cluster adjustment control, group the plurality of digital images into a first plurality of clusters by:
determining time gaps between the plurality of digital images;
sorting the time gaps into a sequential list based on size of the time gaps;
identifying a number of time gaps to satisfy a threshold time difference by adding time gaps to the number of time gaps based on the sequential list; and
generating the first plurality of clusters based on the number of time gaps;
apply a geo-tag of a location to each digital image in a cluster from the first plurality of clusters in response to identifying a user input comprising a user selection of the cluster from the first plurality of clusters and a user selection of the location via the interactive digital map; and
upon applying the geo-tag of the location to each digital image in the cluster, generate a second plurality of clusters from the remaining plurality of digital images; and
provide, for display, the second plurality of clusters and a visual representation of the cluster at the location on the interactive digital map of the location selection control.

16. The non-transitory computer-readable medium of claim 15, wherein the instructions, when executed by the at least one processor, cause the at least one processor to:
identify a first cluster parameter based on the user interaction with the cluster adjustment control;
group the plurality of digital images based on the first cluster parameter; and
generate the second plurality of clusters from the remaining plurality of digital images further by selecting a second cluster parameter different from the first cluster parameter without user input.

17. The non-transitory computer-readable medium of claim 16, wherein the instructions, when executed by the at least one processor, cause the at least one processor to apply the geo-tag by:
identifying an existing geo-tag with regard to at least one digital image in the cluster; and
determining based on the existing geo-tag that the at least one digital image corresponds to the location.

18. The non-transitory computer-readable medium of claim 17, further comprising instructions thereon, that when executed by the at least one processor, cause the at least one processor to: utilize the existing geo-tag associated with the at least one digital image corresponding to the location to apply one or more geo-tags to each digital image in the cluster corresponding to the location.

19. The non-transitory computer-readable medium of claim 15, wherein the instructions, when executed by the at least one processor, cause the at least one processor to group the plurality of digital images in to the first plurality of clusters based on at least one of: individuals portrayed in the plurality of digital images or items portrayed in the digital images.

20. The non-transitory computer-readable medium of claim 16, further comprising instructions thereon, that when executed by the at least one processor, cause the at least one processor to:
identify a third cluster parameter based on user interaction with the cluster adjustment control; and
regroup the plurality of digital images into a third plurality of clusters based on the third cluster parameter.

* * * * *